United States Patent
Ochi

(10) Patent No.: US 10,364,771 B2
(45) Date of Patent: Jul. 30, 2019

(54) CONTROL SYSTEM OF INTERNAL COMBUSTION ENGINE

(71) Applicant: TOYOTA JIDOSHA KABUSHIKI KAISHA, Toyota-shi, Aichi-ken (JP)

(72) Inventor: Yuta Ochi, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/482,041

(22) Filed: Apr. 7, 2017

(65) Prior Publication Data
US 2017/0292463 A1  Oct. 12, 2017

(30) Foreign Application Priority Data

Apr. 11, 2016  (JP) .................................. 2016-078701

(51) Int. Cl.
*F02D 41/40* (2006.01)
*F02P 5/145* (2006.01)
(Continued)

(52) U.S. Cl.
CPC .............. *F02D 41/405* (2013.01); *F02B 3/06* (2013.01); *F02D 35/02* (2013.01); *F02D 35/028* (2013.01);
(Continued)

(58) Field of Classification Search
CPC ........ F02D 41/402–405; F02D 41/3011–3047; F02D 2041/389; F02D 2200/102; F02P 5/145
See application file for complete search history.

(56) References Cited

U.S. PATENT DOCUMENTS 4,621,599 A * 11/1986 Igashira .................... F02B 3/00
                                                        123/300
5,078,107 A    1/1992 Morikawa
(Continued)

FOREIGN PATENT DOCUMENTS

CN   1367861 A    9/2002
DE   19815266 A1  10/1998
(Continued)

OTHER PUBLICATIONS

Non-Final Office Action dated Aug. 15, 2018; issued by the U.S. Patent and Trademark Office in U.S. Appl. No. 15/317,651, 13 pages.
(Continued)

*Primary Examiner* — Hung Q Nguyen
*Assistant Examiner* — Mark L. Greene
(74) *Attorney, Agent, or Firm* — Hunton Andrews Kurth LLP

(57) ABSTRACT

A main injection of fuel from a fuel injector into a combustion chamber is made to auto-ignite. During the compression stroke after the main injection and before the auto-ignition of the fuel injected during the main injection, a first auxiliary injection and a second auxiliary injection are successively injected from the fuel injector. By controlling the injection timing of the first auxiliary injection, the ignition timing of a spark plug, and the injection timing of the second auxiliary injection, the fuel injected during the first auxiliary injection is made to burn by flame propagation combustion by the ignition action of the spark plug, the fuel injected during the second auxiliary injection is made to be injected inside the flame propagation combustion region, and the fuel injected during the second auxiliary injection is made to burn by diffusive combustion before auto-ignition of the fuel injected during the main injection occurs.

4 Claims, 16 Drawing Sheets

(51) Int. Cl.
  *F02D 41/30* (2006.01)
  *F02B 3/06* (2006.01)
  *F02D 35/02* (2006.01)
  *F02D 37/02* (2006.01)
  *F02D 41/38* (2006.01)

(52) U.S. Cl.
  CPC ......... *F02D 37/02* (2013.01); *F02D 41/3023* (2013.01); *F02D 41/3035* (2013.01); *F02D 41/3041* (2013.01); *F02D 41/3047* (2013.01); *F02D 41/40* (2013.01); *F02D 41/402* (2013.01); *F02P 5/145* (2013.01); *F02D 2041/389* (2013.01); *F02D 2200/1002* (2013.01); *Y02T 10/44* (2013.01)

(56) References Cited

U.S. PATENT DOCUMENTS

| | | | |
|---|---|---|---|
| 6,101,998 A | 8/2000 | Tamura et al. | |
| 6,659,073 B1* | 12/2003 | Franke | F02D 35/027 123/299 |
| 6,968,825 B2* | 11/2005 | Hitomi | F01L 1/053 123/406.11 |
| 7,021,279 B1 | 4/2006 | Pott et al. | |
| 7,171,953 B2* | 2/2007 | Altenschmidt | F02D 41/062 123/299 |
| 7,204,228 B2* | 4/2007 | Oechsle | F02D 41/3023 123/295 |
| 7,314,036 B2* | 1/2008 | Altenschmidt | F02D 41/3029 123/299 |
| 7,370,616 B2 | 5/2008 | Kuo et al. | |
| 7,441,537 B2* | 10/2008 | Szekely, Jr. | F02D 41/3023 123/299 |
| 7,565,892 B1 | 7/2009 | Cleary et al. | |
| 7,603,226 B2 | 10/2009 | Henein | |
| 7,723,257 B2 | 5/2010 | Bosteels | |
| 8,091,536 B2 | 1/2012 | Munshi et al. | |
| 8,469,009 B2 | 6/2013 | Munshi et al. | |
| 9,745,914 B2* | 8/2017 | Ochi | F02D 41/3017 |
| 9,784,207 B2 | 10/2017 | Ochi et al. | |
| 2002/0007816 A1 | 1/2002 | Zur Loye et al. | |
| 2002/0026921 A1 | 3/2002 | Ueno et al. | |
| 2005/0257769 A1 | 11/2005 | Li et al. | |
| 2006/0005804 A1 | 1/2006 | Kuo et al. | |
| 2006/0005818 A1 | 1/2006 | Kuo et al. | |
| 2006/0196466 A1 | 9/2006 | Kuo et al. | |
| 2006/0196467 A1 | 9/2006 | Kang et al. | |
| 2006/0196468 A1 | 9/2006 | Chang et al. | |
| 2006/0196469 A1 | 9/2006 | Kuo et al. | |
| 2006/0243241 A1 | 11/2006 | Kuo et al. | |
| 2007/0220873 A1 | 9/2007 | Bosteels | |
| 2008/0040020 A1 | 2/2008 | Henein | |
| 2008/0228378 A1 | 9/2008 | Kohler et al. | |
| 2009/0071440 A1 | 3/2009 | Ashizawa | |
| 2009/0120385 A1 | 5/2009 | Munshi et al. | |
| 2009/0272363 A1 | 11/2009 | Yun et al. | |
| 2009/0299587 A1 | 12/2009 | Ueda et al. | |
| 2010/0228466 A1 | 9/2010 | Ekchian et al. | |
| 2012/0118267 A1 | 5/2012 | Kang et al. | |
| 2012/0160221 A1 | 6/2012 | Munshi et al. | |
| 2012/0191326 A1 | 7/2012 | Sukegawa et al. | |
| 2013/0041571 A1 | 2/2013 | Nogi | |
| 2013/0081592 A1 | 4/2013 | Boer et al. | |
| 2013/0213349 A1 | 8/2013 | Sellnau et al. | |
| 2015/0128909 A1 | 5/2015 | Guralp et al. | |
| 2015/0315957 A1 | 11/2015 | Bergin et al. | |
| 2016/0017834 A1 | 1/2016 | Yun et al. | |
| 2016/0053700 A1* | 2/2016 | Thomas | F02D 41/1446 123/435 |
| 2016/0115895 A1* | 4/2016 | Ochi | F02D 41/3017 123/305 |
| 2016/0153376 A1 | 6/2016 | Katayama et al. | |
| 2016/0333817 A1 | 11/2016 | Ochi et al. | |
| 2016/0333818 A1 | 11/2016 | Ochi et al. | |
| 2017/0107932 A1* | 4/2017 | Ochi | F02D 41/401 |
| 2017/0284282 A1* | 10/2017 | Ochi | F02B 23/101 |

FOREIGN PATENT DOCUMENTS

| | | | |
|---|---|---|---|
| DE | 10 2015 210 745 A1 | 12/2015 | |
| EP | 0952323 A2 | 10/1999 | |
| EP | 1 445 461 A2 | 8/2004 | |
| JP | 200038950 A | 2/2000 | |
| JP | 2001159356 A | 6/2001 | |
| JP | 2002-276442 A | 9/2002 | |
| JP | 2003506608 A | 2/2003 | |
| JP | 2003254105 A * | 9/2003 | ......... F02D 41/3094 |
| JP | 2006307659 A | 11/2006 | |
| JP | 2007064187 A | 3/2007 | |
| JP | 2009108777 A | 5/2009 | |
| JP | 2009228641 A | 10/2009 | |
| JP | 2009264332 A | 11/2009 | |
| JP | 2009287526 A | 12/2009 | |
| JP | 2010090847 A | 4/2010 | |
| JP | 2010203274 A | 9/2010 | |
| JP | 2011-153562 A | 8/2011 | |
| JP | 2015-137585 A | 7/2015 | |
| JP | 2015-137586 A | 7/2015 | |
| JP | 2016000969 A | 1/2016 | |
| WO | 2011111109 A1 | 9/2011 | |
| WO | 2016/042718 A1 | 3/2016 | |

OTHER PUBLICATIONS

United States Patent and Trademark Office, Final Office Action issued to U.S. Appl. No. 15/317,651 dated Dec. 13, 2018, 9 pages.
United States Patent and Trademark Office, Non-Final Office Action issued to U.S. Appl. No. 15/317,651 dated Apr. 11, 2018, 6 pages.
United States Patent and Trademark Office, Notice of Allowance issued to U.S. Appl. No. 15/511,846 on Mar. 19, 2019, 5 pages.
United States Patent and Trademark Office, Non-Final Office Action issued to U.S. Appl. No. 15/511,846 on Nov. 16, 2018, 15 pages.
United States Patent and Trademark Office, Notice of Allowance issued to U.S. Appl. No. 15/317,651 on Apr. 5, 2019, 9 pages.

* cited by examiner

FIG. 13

$$\text{Tr} \begin{array}{|cccccc} QA2_{11} & QA2_{12} & \cdots\cdots\cdots\cdots & QA2_{1n} \\ QA2_{21} & & & \vdots \\ \vdots & & & \vdots \\ \vdots & & & \vdots \\ QA2_{m1} & \cdots\cdots\cdots\cdots\cdots & QA2_{mn} \\ \hline & & & & N \end{array}$$

FIG. 16A $$\text{Tr} \begin{array}{|cccc} W1_{11} & W1_{12} & \cdots\cdots\cdots & W1_{1n} \\ W1_{21} & & & \vdots \\ \vdots & & & \vdots \\ W1_{m1} & \cdots\cdots\cdots\cdots & & W1_{mn} \\ \hline & & & N \end{array}$$

FIG. 16B $$\text{Tr} \begin{array}{|cccc} W2_{11} & W2_{12} & \cdots\cdots\cdots & W2_{1n} \\ W2_{21} & & & \vdots \\ \vdots & & & \vdots \\ W2_{m1} & \cdots\cdots\cdots\cdots & & W2_{mn} \\ \hline & & & N \end{array}$$

FIG. 16C $$\text{Tr} \begin{array}{|cccc} IG_{11} & IG_{12} & \cdots\cdots\cdots & IG_{1n} \\ IG_{21} & & & \vdots \\ \vdots & & & \vdots \\ IG_{m1} & \cdots\cdots\cdots\cdots & & IG_{mn} \\ \hline & & & N \end{array}$$

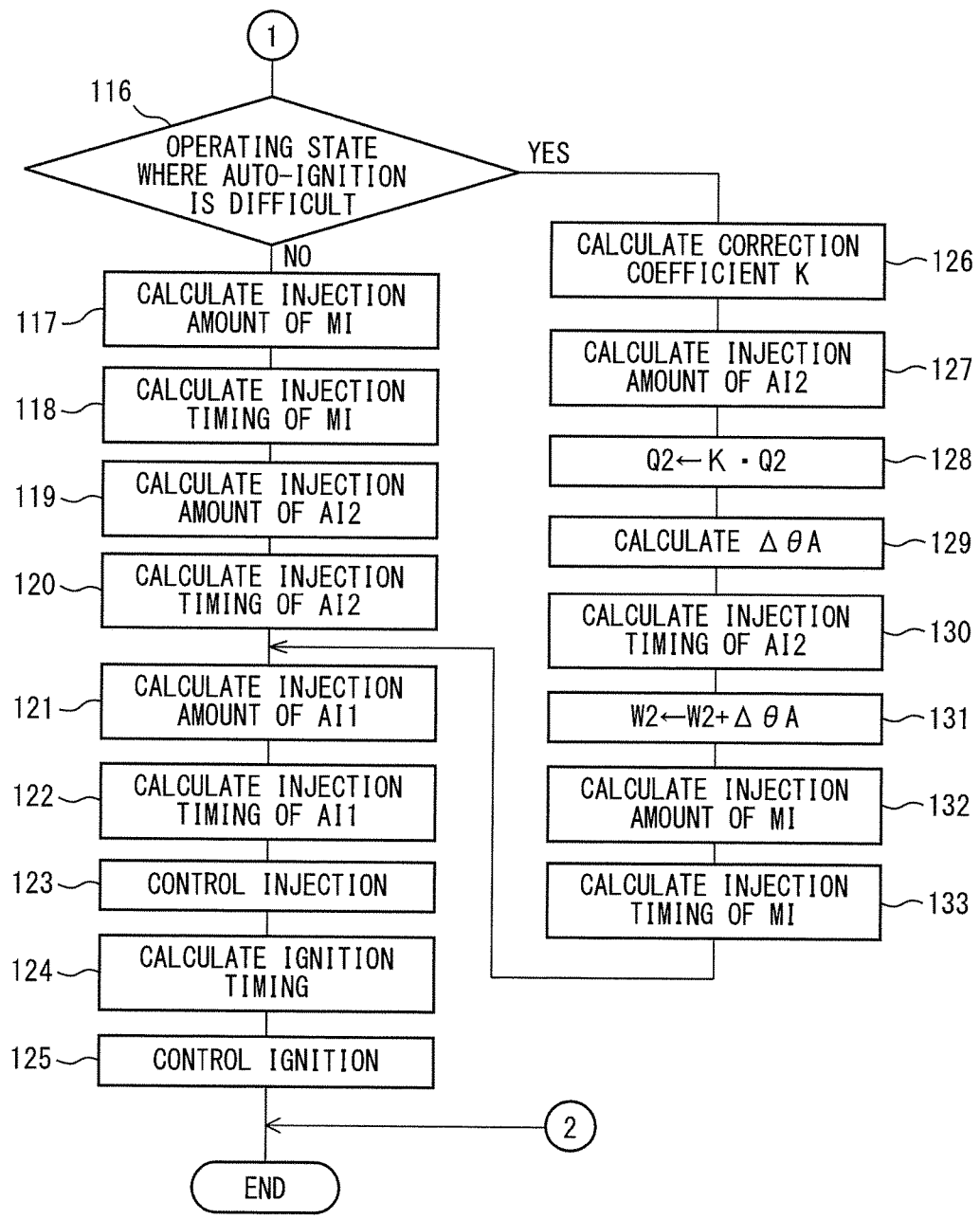

CONTROL SYSTEM OF INTERNAL COMBUSTION ENGINE

CROSS-REFERENCE TO RELATED APPLICATION

The present application claims priority to Japanese Patent Application No. 2016-078701 filed on Apr. 11, 2016, which is incorporated herein by reference in its entirety.

TECHNICAL FIELD

The present invention relates to a control system of an internal combustion engine.

BACKGROUND ART

In an internal combustion engine, the more the compression ratio is raised, the more the thermal efficiency is improved, while the leaner the air-fuel ratio of the air-fuel mixture is made, the more the fuel consumption is improved. In this case, in a conventional spark ignition combustion internal combustion engine using a spark plug to cause part of an air-fuel mixture to ignite and using flame propagation of the ignited flame to make the remaining air-fuel mixture burn, if raising the compression ratio, knocking occurs, so the compression ratio cannot be raised.

Further, if making the air-fuel ratio of the air-fuel mixture leaner, the ignited flame can no longer be propagated, so the air-fuel ratio of the air-fuel mixture cannot be made leaner. As opposed to this, auto-ignition combustion is possible even if raising the compression ratio and is possible even if making the air-fuel ratio of the air-fuel mixture leaner, so if performing auto-ignition combustion, it is possible to improve the thermal efficiency and possible to improve the fuel consumption.

Further, in this auto-ignition combustion, the fuel diffused in the combustion chamber is made to burn inside the combustion chamber simultaneously at multiple points. If the diffused fuel is made to burn simultaneously in multiple points in this way, the combustion temperature becomes lower as a whole, so the formation of $NO_X$ is suppressed. Further, there is sufficient oxygen present around the fuel, so formation of unburned HC is also suppressed. In this way, auto-ignition combustion has many advantages, so has been looked at closely since the past. Numerous internal combustion engines designed to perform auto-ignition combustion are known (for example, see Japanese Patent Publication No. 2011-153562A).

SUMMARY OF INVENTION

Technical Problem

In this way, auto-ignition combustion has many advantages. However, as explained above, in auto-ignition combustion, the fuel diffused inside the combustion chamber is made to burn in the combustion chamber simultaneously at multiple points, so if the amount of fuel fed to the combustion chamber becomes larger, the combustion pressure rapidly increases and as a result the problem arises of generation of combustion noise.

Solution to Problem

To solve this problem, according to the present invention, there is provided a control system of an internal combustion engine comprising a fuel injector arranged in a combustion chamber and injecting fuel comprised of gasoline, a spark plug arranged in the combustion chamber and igniting fuel injected from the fuel injector, and an electronic control unit controlling an action of injection of fuel from the fuel injector and an action of ignition by the spark plug, main fuel injected from the fuel injector into the combustion chamber being caused to be auto-ignited, wherein a first auxiliary fuel and a second auxiliary fuel are successively injected from the fuel injector during a compression stroke after injection of the main fuel and before auto-ignition of the main fuel occurs, and the electronic control unit is configured to control an injection timing of the first auxiliary fuel, an ignition timing of the spark plug, and an injection timing of the second auxiliary fuel so that the first auxiliary fuel is made to burn by flame propagation combustion by the action of ignition by the spark plug, the second auxiliary fuel is made to be injected in a flame propagation combustion region, and the second auxiliary fuel is made to burn by diffusive combustion before the auto-ignition of the main fuel occurs.

Advantageous Effects of Invention

The amount of main fuel to be auto-ignited is suppressed and part of the fuel to be burned in the combustion chamber is made to burn by diffusive combustion before the main fuel auto-ignites, so rapid rise of the combustion pressure is prevented. Due to this, the combustion noise at the time of auto-ignition combustion can be reduced.

BRIEF DESCRIPTION OF DRAWINGS

FIG. 13 is a view showing a map of an injection amount QA2 of second auxiliary fuel AI2.

FIGS. 16A, 16B, and 16C are respectively views showing a map of injection timing W1 of first auxiliary fuel AI1, a map of injection timing W2 of second auxiliary fuel injection AI2, and a map of ignition timing IG.

FIG. 19 is a flow chart for engine operational control.

DESCRIPTION OF EMBODIMENTS

Figure 1:
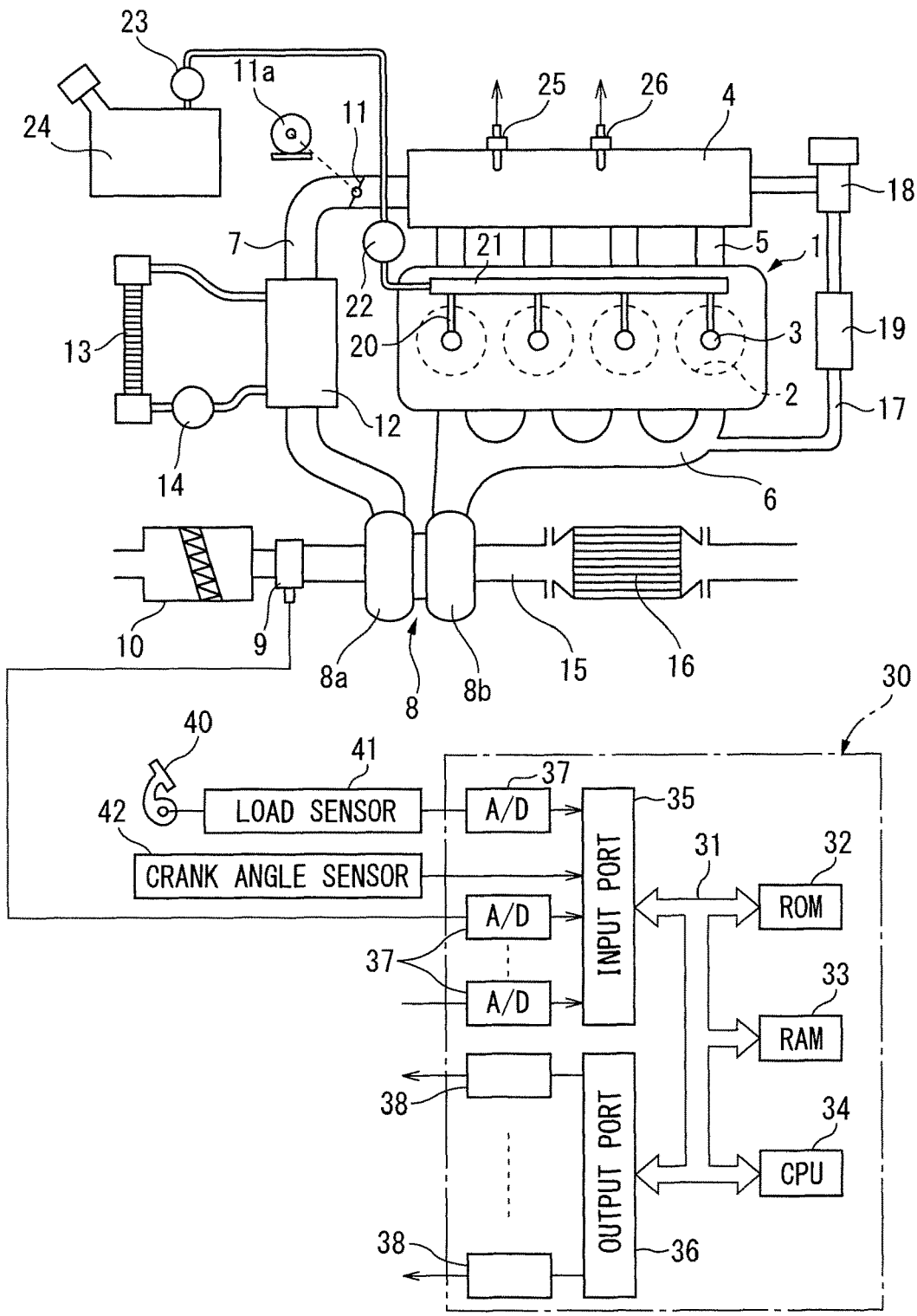
FIG. 1 is an overall view of an internal combustion engine fueled by gasoline.

FIG. 1 shows an overall view of an internal combustion engine fueled by gasoline. Referring to FIG. 1, 1 indicates an engine body, 2 a combustion chamber of each cylinder, 3 an electronic control type fuel injector for injecting fuel comprised of gasoline to each combustion chamber 2, 4 a surge tank, 5 an intake branch pipe, and 6 an exhaust manifold. The surge tank 4 is connected through an intake duct 7 to the outlet of a compressor 8a of an exhaust turbocharger 8, while the inlet of the compressor 8a is connected through an intake air amount detector 9 to an air cleaner 10. Inside the intake duct 7, a throttle valve 11 driven by an actuator 11a is arranged. Around the intake duct 7, an intercooler 12 is arranged for cooling the intake air flowing through the inside of the intake duct 7. As shown in FIG. 1, this intercooler 12 is provided with an intercooler radiator 13 and an electric power cooling water pump 14 for making the cooling water cooled at the radiator 13 circulate to the intercooler 12.

On the other hand, the exhaust manifold 6 is connected to the inlet of the exhaust turbine 8b of the exhaust turbocharger 8, while the outlet of the exhaust turbine 8b is connected through an exhaust pipe 15 to an exhaust purification catalytic converter 16. The exhaust manifold 6 and surge tank 4 are connected with each other through an exhaust gas recirculation (hereinafter referred to as "EGR") passage 17. Inside the EGR passage 17, an electronic control type EGR control valve 18 is arranged. Around the EGR passage 17, an EGR cooler 19 is arranged for cooling the EGR gas flowing through the inside of the EGR passage 17. In the embodiment shown in FIG. 1, the engine cooling water is guided to the inside of the EGR cooler 19 where the engine cooling water cools the EGR gas. Further, each fuel injector 3 is connected through a fuel feed line 20 to a fuel distributor 21. This fuel distributor 21 is connected through a high pressure fuel pump 22 and low pressure fuel pump 23 to a fuel tank 24. Note that, the internal combustion engine shown in FIG. 1 has a high compression ratio of 14 or more.

The intake air is supplied through the intake air amount detector 9, compressor 8a, intercooler 12, and intake duct 7 to the inside of the surge tank 4. The intake air supplied to the inside of the surge tank 4 is supplied through intake branch pipes 5 to the individual combustion chambers 2. Further, inside the surge tank 4, EGR gas is supplied through the EGR passage 17. This EGR gas is also supplied together with the intake air through the intake branch pipes 5 to the individual combustion chambers 2. On the other hand, the fuel stored inside the fuel tank 24, that is, the gasoline, is supplied by the low pressure fuel pump 23 and high pressure fuel pump 22 to the inside of the fuel distributor 21. The fuel supplied to the fuel distributor 21 is injected through the individual fuel feed lines 20 from the fuel injectors 3 to the individual combustion chambers 2. The exhaust gas discharged from the combustion chambers 2 is discharged through the exhaust manifold 6, exhaust turbine 8b, exhaust pipe 15, and exhaust purification catalytic converter 16 to the outside air.

The electronic control unit 30 is comprised of a digital computer provided with a ROM (read only memory) 32, RAM (random access memory) 33, CPU (microprocessor) 34, input port 35, and output port 36, which are connected with each other by a bidirectional bus 31. Inside the surge tank 4, a temperature sensor 25 for detecting the intake air temperature and a pressure sensor 26 for detecting the intake pressure are arranged. The output signals of these temperature sensor 25, pressure sensor 26, and intake air amount detector 9 are input through respectively corresponding AD converters 37 to the input port 35. Further, at an accelerator pedal 40, a load sensor 41 generating an output voltage proportional to the amount of depression of the accelerator pedal 40 is connected. The output voltage of the load sensor 41 is input through a corresponding AD converter 37 to the input port 35. Further, at the input port 35, a crank angle sensor 42 generating an output pulse every time the crankshaft rotates by for example 30° is connected. On the other hand, the output port 36 is connected through corresponding drive circuits 38 to the fuel injectors 3, throttle valve drive actuator 11a, cooling water pump 14, EGR control valve 18, high pressure fuel pump 22, and low pressure fuel pump 23.

Figure 2:
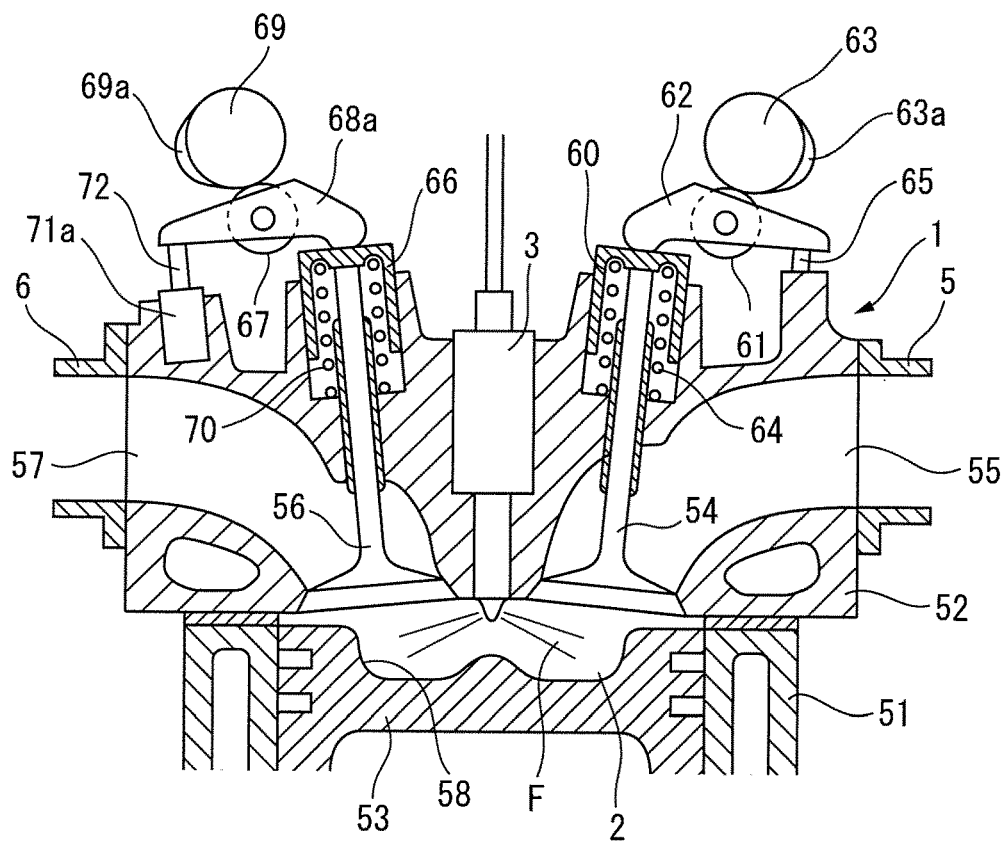
FIG. 2 is a cross-sectional view of an engine body.
Figure 3:
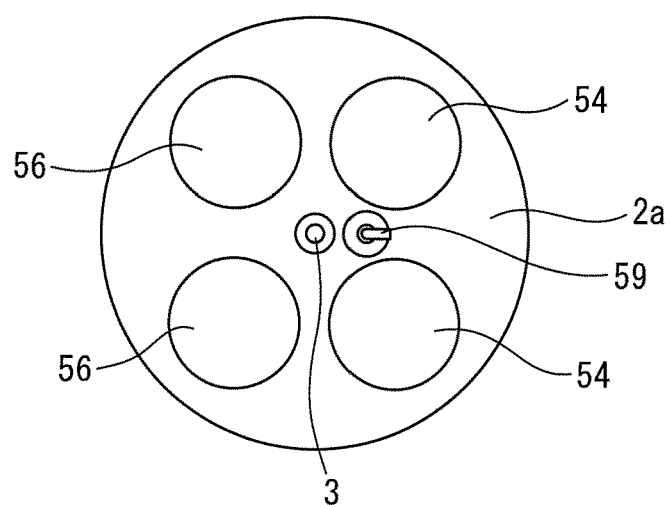
FIG. 3 is a bottom view of a top wall of a combustion chamber shown in FIG. 2.

FIG. 2 shows a cross-sectional view of the engine body 1 shown in FIG. 1, while FIG. 3 shows a bottom view of a top wall of the combustion chamber 2 shown in FIG. 2. Note that, in FIG. 2 and FIG. 3, 51 indicates a cylinder block, 52 a cylinder head attached on the cylinder block 51, 53 a piston reciprocating inside the cylinder block 51, 54 a pair of intake valves, 55 an intake port, 56 a pair of exhaust valves, and 57 an exhaust port. As shown in FIG. 3, the fuel injector 3 is arranged at the center of the top wall 2a of the combustion chamber 2. From the fuel injector 3, as shown by F, fuel is injected toward the periphery of a cavity 58 formed in the top surface of the piston 53. Further, at the top wall 2a of the combustion chamber 2, a spark plug 59 is arranged adjoining the fuel injector 3.

On the other hand, as shown in FIG. 2, for each intake valve 54, a valve lifter 60, a rocker arm 62 provided with a roller 61, and an intake valve-use camshaft 63 are provided. The valve lifter 60 is supported inside the cylinder head 52 to be able to slide and is seated on the top end part of the intake valve 54. Inside the valve lifter 60, a compression spring 64 for biasing the valve lifter 60 upward is arranged. One end of the rocker arm 62 is supported by a fixed support member 65, while the other end of the rocker arm 62 is seated on the top wall surface of the valve lifter 60. If the camshaft 63 turns and a cam 63a formed on the camshaft 63 causes the roller 61 to be pushed downward, the rocker arm 62 turns counterclockwise about the fixed support member 65 and thereby the intake valve 54 is made to open.

Similarly, for each exhaust valve 56, a valve lifter 66, a rocker arm 68a provided with a roller 67, and an exhaust valve-use camshaft 69 are provided. The valve lifter 66 is supported inside the cylinder head 52 to be able to slide and is seated on the top end part of the exhaust valve 56. Inside the valve lifter 66, a compression spring 70 for biasing the valve lifter 66 upward is arranged. One end of the rocker arm 68a is supported by the front end part of a movable rod 72 of a support position adjusting device 71a, while the other end of the rocker arm 68a is seated on the top wall surface of the valve lifter 66. When the movable rod 72 of the support position adjusting device 71a is held at the projecting position shown in FIG. 2, if the camshaft 69 turns and a cam 69a formed on the camshaft 69 causes the roller 67 to be pushed downward, the rocker arm 68*a* turns clockwise about the front end part of the movable rod 72 and thereby the exhaust valve 56 is made to open.

Figure 4:
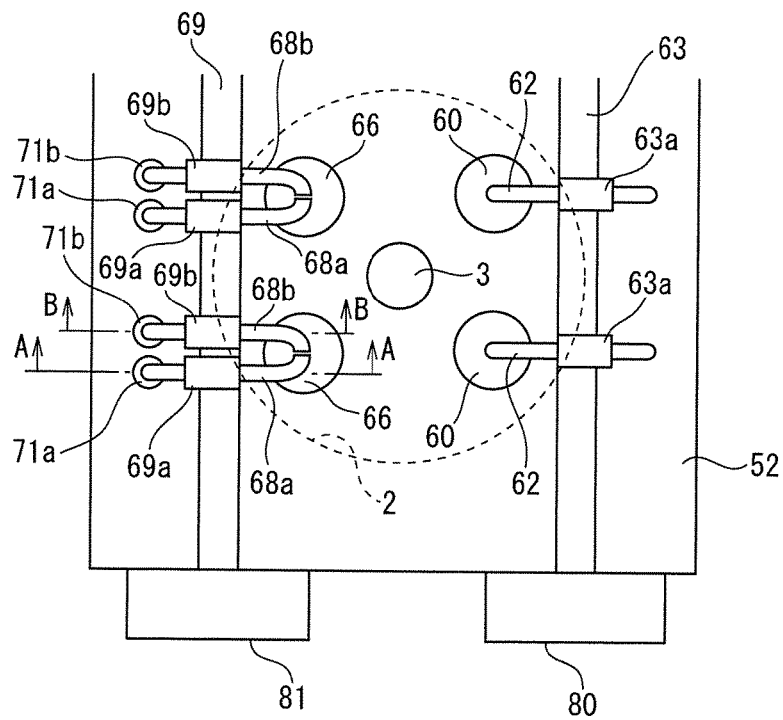
FIG. 4 is a plan view of an end part of a cylinder head in the longitudinal direction.
Figure 5A:
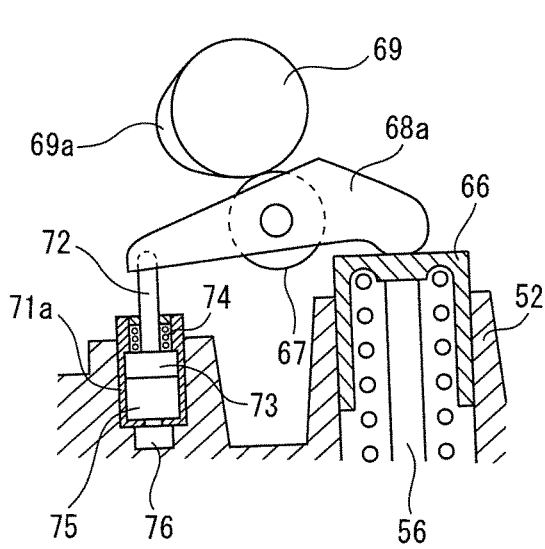
FIG. 5A and FIG. 5B are views showing an A-A cross-section and B-B cross-section in FIG. 4.
Figure 5B:
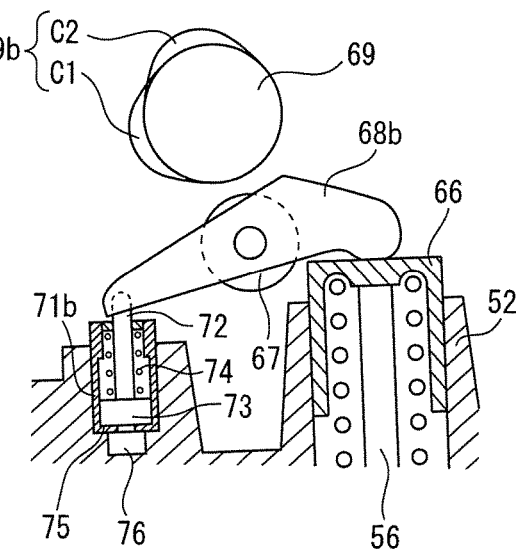

FIG. 4 is a plan view of an end part of the cylinder head 52 in the longitudinal direction, FIG. 5A shows an A-A cross-section at FIG. 4, while FIG. 5B shows a B-B cross-section at FIG. 4. As shown in FIG. 4, the end part of the intake valve-use camshaft 63 is connected to a variable valve timing mechanism 80 able to change the opening timing of the intake valve 54, while the end part of the exhaust valve-use camshaft 69 is connected to a variable valve timing mechanism 81 able to change the opening timing of the exhaust valve 56. On the other hand, as shown in FIG. 4, for the valve lifter 60 of each intake valve 54, one rocker arm 62 and one cam 63*a* are provided, while for the valve lifter 66 of each exhaust valve 56, a pair of rocker arms 68*a*, 68*b*, a pair of cams 69*a*, 69*b*, and a pair of support position adjusting devices 71*a*, 71*b* are provided.

The support position adjusting device 71*a* and the support position adjusting device 71*b* have the same structures. Next, the structures of these support position adjusting devices 71*a*, 71*b* will be explained with reference to FIG. 5A and FIG. 5B. As shown in FIG. 5A and FIG. 5B, the support position adjusting devices 71*a*, 71*b* are provided with pistons 73 connected to the movable rods 72 inside the support position adjusting devices 71*a*, 71*b* and able to move in the axial directions of the movable rods 72, compression springs 74 biasing the pistons 73 downward, and hydraulic chambers 75 defined by the pistons 73. Inside the hydraulic chambers 75, hydraulic fluid is supplied through hydraulic passages 76 formed inside the cylinder head 52.

FIG. 5A shows when hydraulic fluid is supplied to the inside of the hydraulic chamber 75 of the support position adjusting device 71*a*, while FIG. 5B shows when hydraulic fluid is discharged from the hydraulic chamber 75 of the support position adjusting device 71*b*. As shown in FIG. 5A, if hydraulic fluid is supplied to the hydraulic chamber 75 of the support position adjusting device 71*a*, the piston 73 rises and the movable rod 72 is held at the projecting position. At this time, if the camshaft 69 turns, a cam 69*a* formed on the camshaft 69 causes a roller 67 to be pushed downward. Due to this, the exhaust valve 56 is opened. On the other hand, as shown in FIG. 5B, if the hydraulic fluid inside the hydraulic chamber 75 of the support position adjusting device 71*b* is discharged, the piston 73 descends and the movable rod 72 is held at the retracted position. At this time, even if the camshaft 69 turns, a cam 69*b* formed on the camshaft 69 does not engage with the roller 67. Therefore, at this time, no opening operation of the exhaust valve 56 due to the cam 69*b* is performed.

As shown in FIG. 5A, a cam 69*a* formed on the camshaft 69 has only one cam lobe. As opposed to this, as shown in FIG. 5B, a cam 69*b* formed on the camshaft 69 has two cam lobes comprised of a cam lobe C1 and a cam lobe C2 smaller than the cam lobe C1. The cam lobe of the cam 69*a* shown in FIG. 5A is formed so as to make the exhaust valve 56 open during the exhaust stroke. The larger cam lobe C1 of the cam 69*b* shown in FIG. 5B is also formed so as to make the exhaust valve 56 open during the exhaust stroke. As opposed to this, the smaller cam lobe C2 of the cam 69*b* shown in FIG. 5B is formed so as to make the exhaust valve 56 open during the suction stroke. Therefore, if, as shown in FIG. 5A, hydraulic fluid is supplied to the inside of the hydraulic chamber 75 of the support position adjusting device 71*a* and, as shown in FIG. 5B, the hydraulic fluid inside the hydraulic chamber 75 of the support position adjusting device 71*b* is discharged, the exhaust valve 56 is made to open during the exhaust stroke. As opposed to this, if the hydraulic fluid inside the hydraulic chamber 75 of the support position adjusting device 71*a* is discharged and hydraulic fluid is supplied to the inside of the hydraulic chamber 75 of the support position adjusting device 71*b*, the exhaust valve 56 opens during the exhaust stroke, then again opens during the suction stroke.

In this way, by controlling the supply of hydraulic fluid to the support position adjusting devices 71*a*, 71*b* and the discharge of the hydraulic fluid from the support position adjusting devices 71*a*, 71*b*, it is possible to switch the opening action of the exhaust valve 56 to either single opening during the exhaust stroke or double opening during the exhaust stroke and during the suction stroke. Note that, the valve operating mechanism shown in FIG. 4, FIG. 5A, and FIG. 5B for switching the valve opening action of the exhaust valve 56 to opening once during the exhaust stroke or opening twice during the exhaust stroke and during the suction stroke is just a representative single example. Instead of the valve operating mechanism shown in FIG. 4, FIG. 5A, and FIG. 5B, it is also possible to employ various other valve opening mechanisms enabling the valve opening action of the exhaust valve 56 to be switched to either opening once during the exhaust stroke or opening twice during the exhaust stroke and during the suction stroke.

Figure 6:
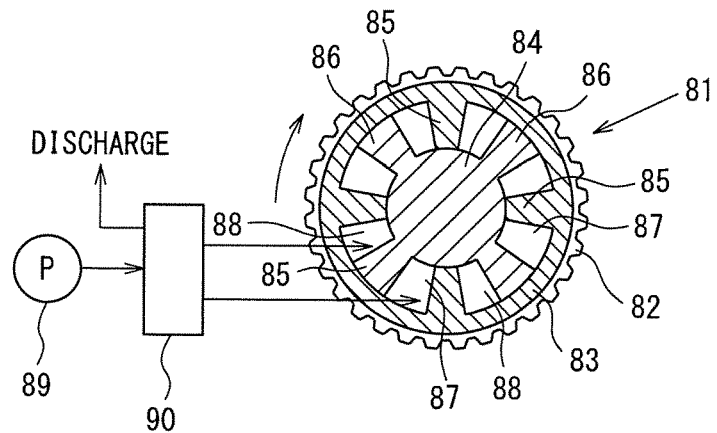
FIG. 6 is a cross-sectional view of an exhaust valve-use variable valve timing mechanism.

FIG. 6 is a cross-sectional view of the variable valve timing mechanism 81 shown in FIG. 4 which can change the opening timing of the exhaust valve 56. Note that, the variable valve timing mechanism 80 shown in FIG. 4 which can change the opening timing of the intake valve 54 has a similar structure to the variable valve timing mechanism 81. Referring to FIG. 6, this variable valve timing mechanism 81 is provided with a timing pulley 82 made to rotate by the crankshaft of the engine through a timing belt in the arrow direction, a cylindrical housing 83 rotating together with the timing pulley 82, a shaft 84 able to rotate together with the exhaust valve-use camshaft 69 and rotate relative to the cylindrical housing 83, a plurality of partitions 85 extending from the inner circumferential surface of the cylindrical housing 83 to the outer circumferential surface of the shaft 84, and vanes 86 extending between the partitions 85 from the outer circumferential surface of the shaft 84 to the inner circumferential surface of the cylindrical housing 83. At the two sides of each vane 86, an advancing-use hydraulic chamber 87 and a retarding-use hydraulic chamber 88 are formed.

The supply of hydraulic fluid from the hydraulic fluid supply pump 89 to the hydraulic chambers 87 and 88 and the discharge of hydraulic fluid from the hydraulic chambers 87 and 88 are controlled by the hydraulic fluid feed/discharge control valve 90. When advancing the phase of the cam of the exhaust valve-use camshaft 69, the hydraulic fluid feed/discharge control valve 90 is used to make the hydraulic fluid be supplied to the advancing-use hydraulic chamber 87 and make the hydraulic fluid inside the retarding-use hydraulic chamber 88 be discharged. At this time, the shaft 84 is made to rotate relative to the cylindrical housing 83 in the arrow direction. As opposed to this, when the phase of the cam of the exhaust valve-use camshaft 69 should be retarded, the hydraulic fluid feed/discharge control valve 90 is used to make the hydraulic fluid be supplied to the retarding-use hydraulic chamber 88 and make the hydraulic fluid be discharged from the advancing-use hydraulic chamber 87. At this time, the shaft 84 is made to rotate relative to the cylindrical housing 83 in the opposite direction to the arrow mark. If the actions of feed of hydraulic fluid to the hydraulic chambers 87 and 88 and actions of discharge of hydraulic fluid from the hydraulic chambers 87 and 88 are stopped when the shaft 84 is made to rotate relative to the cylindrical housing 83, the relative rotation operation of the shaft 84 is made to stop and the shaft 84 is held at the relative rotation position at that time. Therefore, it is possible to make the phase of the cam of the exhaust valve-use camshaft 69 advance and retard it by exactly a desired amount by the variable valve timing mechanism 81.

Figure 7A:
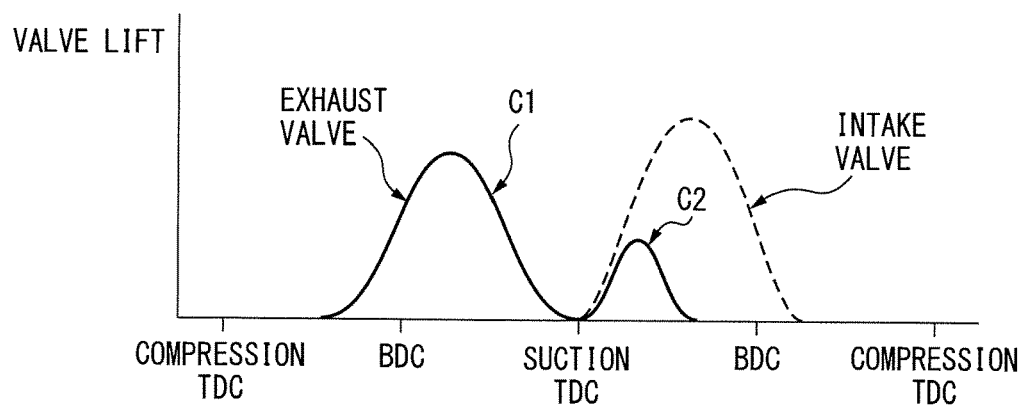
FIGS. 7A and 7B are views showing changes in an exhaust valve lift and intake valve lift.
Figure 7B:
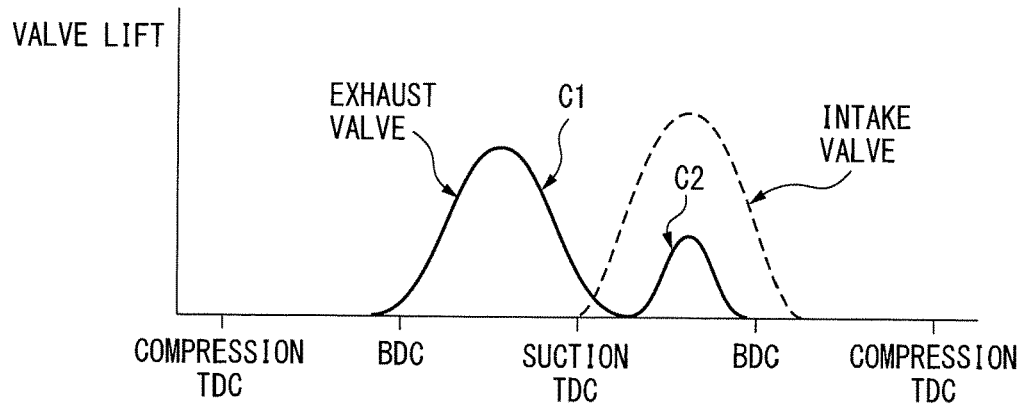

The solid lines in FIGS. 7A and 7B show the changes in the exhaust valve lift when opening actions of the exhaust valve 56 are performed by the cam 69b having two cam lobes C1 and C2 shown in FIG. 5B. As explained above, the cam lobe C2 is smaller than the cam lobe C1. Therefore, as shown in FIGS. 7A and 7B, the amount of exhaust valve lift and the opening period of the exhaust valve 56 due to the cam lobe C2 become smaller than the amount of exhaust valve lift and the opening period of the exhaust valve 56 due to the cam lobe C1. The broken lines of FIGS. 7A and 7B show changes in the intake valve lift. Further, FIG. 7A shows when the variable valve timing mechanism 81 causes the phase of the cam of the exhaust valve-use camshaft 69 to be advanced the most. At this time, the exhaust valve 56 continues open during the exhaust stroke, then is closed once near suction top dead center TDC, next is immediately opened and continues open over the first half of the suction stroke where the intake valve 54 is open. On the other hand, FIG. 7B shows when the variable valve timing mechanism 81 causes the phase of the cam of the exhaust valve-use camshaft 69 to be retarded the most. At this time, the opening timings of the exhaust valve 56 due to the cam lobes C1 and C2 are both retarded.

As shown in FIG. 7A, when the phase of the cam of the exhaust valve-use camshaft 69 is advanced the most, the action of opening the exhaust valve 56 by the cam lobe C2 is performed when the amount of intake valve lift is small, so at this time, a large amount of exhaust gas is pulled back from the inside of the exhaust port 57 to the inside of the combustion chamber 2, therefore, at this time, the intake air temperature of the inside of the combustion chamber 2 increases and the amount of residual gas inside the intake air inside the combustion chamber 2 increases. On the other hand, as shown in FIG. 7B, if the phase of the cam of the exhaust valve-use camshaft 69 is retarded the most, a large amount of intake air flows into the combustion chamber 2, then the action of opening the exhaust valve 56 by the cam lobe C2 is performed. Therefore, at this time, the amount of exhaust gas pulled back from the inside of the exhaust port 57 to the inside of the combustion chamber 2 becomes smaller. Therefore, at this time, the action of increase of the intake air temperature inside the combustion chamber 2 weakens and the action of increase of the amount of residual gas inside the intake air in the combustion chamber 2 also weakens. By using the variable valve timing mechanism 81 to change the phase of the cam of the exhaust valve-use camshaft 69 in this way, the action of increase of the intake air temperature inside the combustion chamber 2 and the action of increase of the amount of residual gas in the intake air in the combustion chamber 2 can be controlled. Note that, the variable valve timing mechanism 81 shown in FIG. 6 shows one example. Various other types of variable valve timing mechanisms can be used.

Now then, as explained above, in auto-ignition combustion, the fuel diffused inside the combustion chamber 2 is made to burn inside the combustion chamber 2 simultaneously at multiple points. In order to obtain sufficient engine output torque when engine is operated by using this auto-ignition combustion, auto-ignition must be caused at the optimum auto-ignition timing where the torque generated by the engine becomes maximum after compression top dead center. In this case, it is not possible to cause auto-ignition at the optimum self-ignition timing where the torque generated by the engine becomes maximum after compression top dead center no matter what the operating state of the engine. The operating state of the engine where auto-ignition can be caused at the optimum auto-ignition timing where the torque generated by the engine becomes maximum after compression top dead center is limited. This operating state of the engine where auto-ignition can be caused at the optimum auto-ignition timing where the torque generated by the engine becomes maximum after the compression top dead center is shown as the auto-ignition region surrounded by the solid line RR in FIG. 8. Note that, in FIG. 8, the ordinate shows the torque Tr generated by the engine, while the abscissa shows the engine speed N.

That is, a reaction time is required until the air-fuel mixture auto-ignites in the combustion chamber 2. If the engine speed becomes higher, the reaction time required for the air-fuel mixture to auto-ignite can no longer be secured. Therefore, in FIG. 8, if the engine speed becomes higher than the auto-ignition region RR, misfire will occur and the auto-ignition operation can no longer be sustained. On the other hand, if the engine load becomes higher and the torque generated by the engine exceeds the auto-ignition region RR, pre-ignition occurs and knocking occurs, so good auto-ignition operation can no longer be sustained. Therefore, as shown by the auto-ignition region RR of FIG. 8, auto-ignition operation can be performed when the engine speed is relatively low and the torque generated by the engine is relatively low. In the embodiment according to the present invention, in the engine operating region other than the auto-ignition region RR, spark ignition combustion using the spark plug 59 to ignite part of the air-fuel mixture and using propagation of the ignited flame to make the remaining air-fuel mixture burn is performed.

In this regard, generally speaking, if the temperature of the air-fuel mixture in the combustion chamber 2 does not exceed 900K, auto-ignition combustion does not occur. Therefore, in the auto-ignition region RR of FIG. 8, at the time of engine low load operation where the pressure and temperature of the air-fuel mixture at the start of compression are low, the cooling action of the intake air by the intercooler 12 is suppressed so that the temperature of the air-fuel mixture in the combustion chamber 2 exceeds 900K and, as shown in FIGS. 7A and 7B, the exhaust valve 56 is opened twice so that the temperature of the air-fuel mixture is made to rise. For example, at the time of engine low load operation inside the auto-ignition region RR, the temperature of the intake air supplied to the combustion chamber 2 is made to rise by stopping the circulation of cooling water to the intercooler 12, and the temperature of the air-fuel mixture is made to rise by making the exhaust valve 56 open twice as shown in FIG. 7A to pull back a large amount of exhaust gas inside the combustion chamber 2. As opposed to this, in the high engine load region in the auto-ignition region RR of FIG. 8, the turbocharger 8 causes the intake air pressure and intake air temperature to become too high, so at this time, the cooling action of the intake air by the intercooler 12 is strengthened, and the exhaust valve 56 is made to open once during the exhaust stroke as shown in FIG. 5A to thereby suppress the rise of the temperature of the air-fuel mixture. In this way, in the embodiment according to the present invention, auto-ignition combustion is performed by controlling the intake air temperature and controlling the amount of exhaust gas pulled back into the combustion chamber 2 in accordance with the operating state of the engine.

Figure 9A:
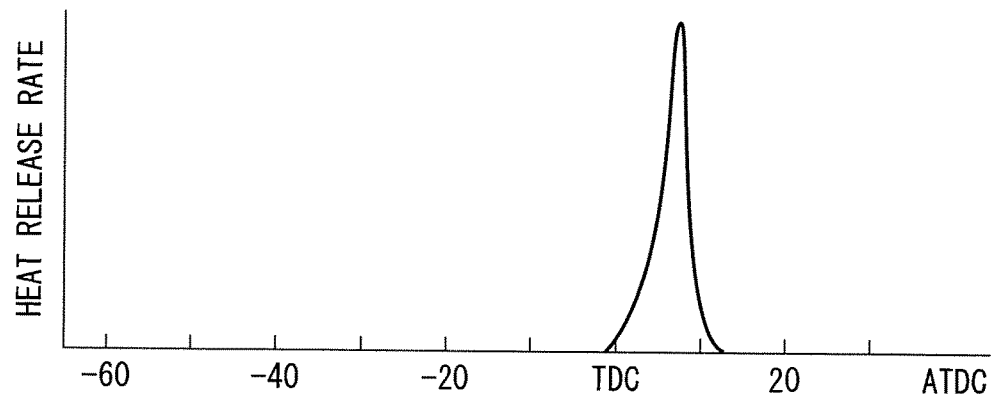
FIGS. 9A and 9B are views for explaining a heat release rate and combustion noise when auto-ignition combustion is performed.

Now then, as explained above, in the auto-ignition region RR, it is possible to cause auto-ignition at the optimum auto-ignition timing where the torque generated by the engine becomes maximum. In this case, in the auto-ignition region RR, when the amount of fuel injection to the combustion chamber 2 is small and the torque generated by the engine is low, the heat release rate is low. At this time, the heat release rate does not rapidly increase and therefore the combustion pressure does not rapidly increase, so large combustion noise is never generated. As opposed to this, in the auto-ignition region RR, when the amount of fuel injection to the combustion chamber 2 becomes larger and the torque generated by the engine becomes higher, the heat release rate becomes higher. At this time, as shown in FIG. 9A, the heat release rate rapidly increases, so the combustion pressure rapidly increases and as a result large combustion noise is generated.

Figure 8:
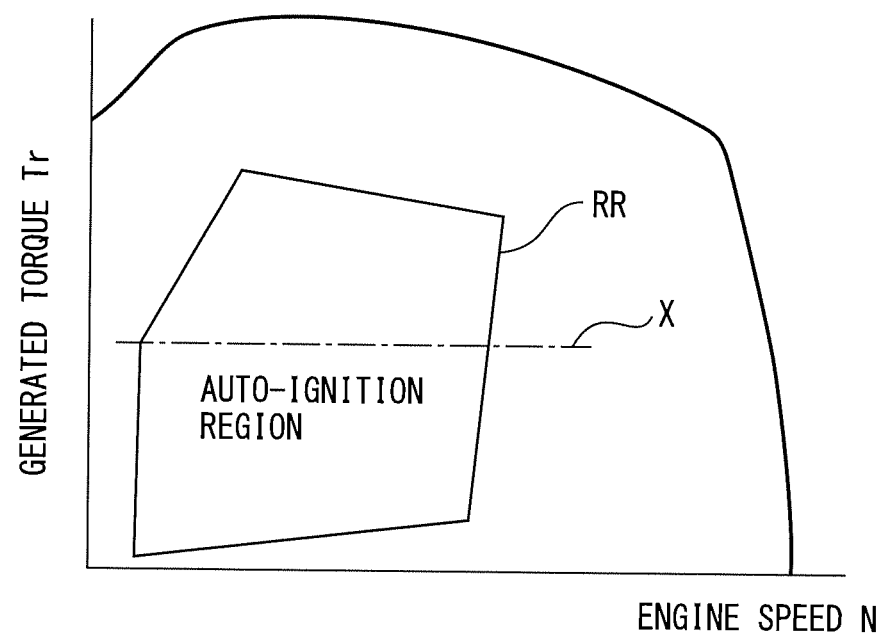
FIG. 8 is a view showing an auto-ignition region RR.
Figure 9B:
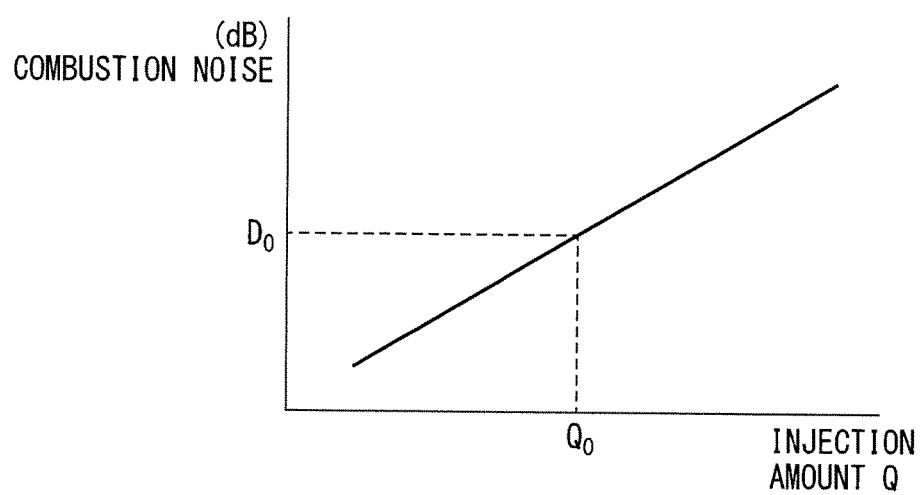

FIG. 9B shows the relationship between the fuel injection amount Q to the combustion chamber 2 and the combustion noise when auto-ignition combustion is performed in the auto-ignition region RR. As shown in FIG. 9B, when auto-ignition combustion is being performed inside the auto-ignition region RR, the combustion noise becomes greater as the fuel injection amount to the inside of the combustion chamber 2 becomes larger. On the other hand, in FIG. 9B, the combustion noise $D_0$ shows the limit of the allowable combustion noise. Therefore, it is necessary to prevent the combustion noise from exceeding this allowable limit combustion noise $D_0$. Further, the injection amount $Q_0$ in FIG. 9B shows the fuel injection amount Q to the combustion chamber 2 when the combustion noise becomes the allowable limit combustion noise $D_0$. Therefore, to prevent the combustion noise from exceeding this allowable limit combustion noise $D_0$, the fuel injection amount Q has to be kept from exceeding the injection amount $Q_0$. In FIG. 8, the dot-dash line X shows the boundary at which the combustion noise becomes the allowable limit combustion noise $D_0$. Large combustion noise is generated in the auto-ignition region RR where the torque generated by the engine is higher than this boundary X.

Figure 10:
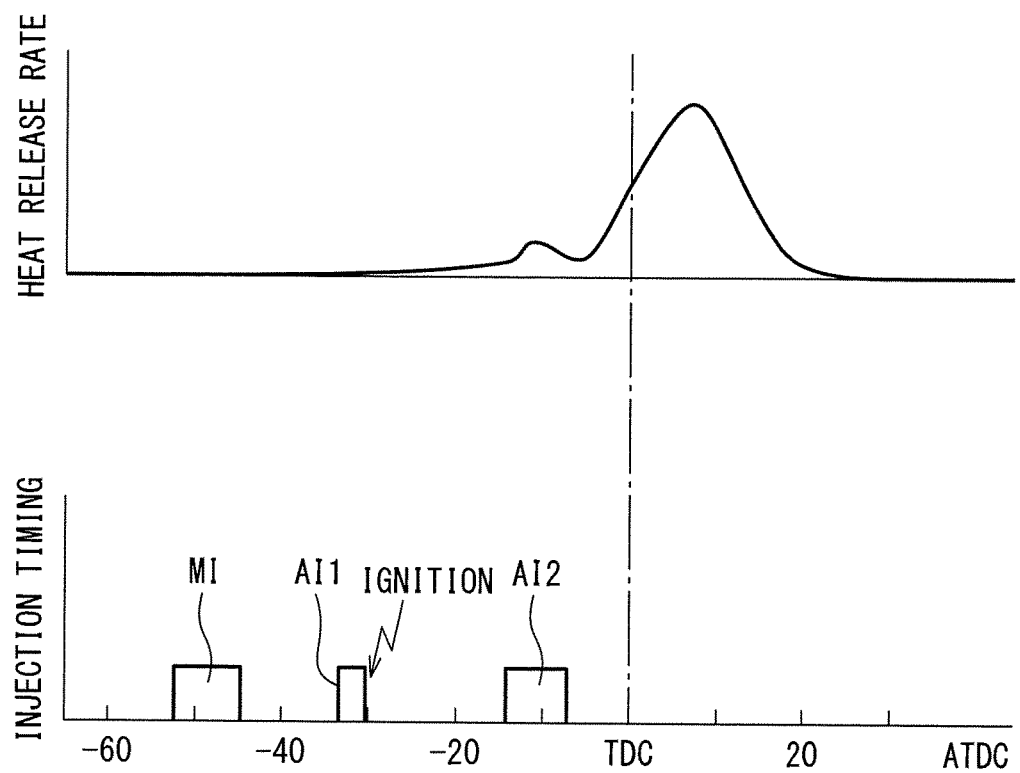
FIG. 10 is a view showing injection control according to the present invention and a heat release rate when auto-ignition combustion is performed by this injection control.

Therefore, in the embodiment according to the present invention, when the fuel injection amount Q exceeds the injection amount $Q_0$, the injection amount of the main fuel MI for causing auto-ignition combustion is suppressed to the injection amount $Q_0$, and as shown in FIG. 10, in addition to the main fuel MI, the first auxiliary fuel AI1 and the second auxiliary fuel AI2 are made to be successively injected from the fuel injector 3. At this time, the action of ignition by the spark plug 59 is used to make the first auxiliary fuel AI1 burn by flame propagation combustion, next the second auxiliary fuel AI2 is injected into the flame propagation combustion region to make the second auxiliary fuel AI2 burn by diffusive combustion before auto-ignition of the main fuel MI occurs, and thereby generation of large combustion noise is prevented. Next, this will be explained with reference to FIG. 11.

FIG. 11 illustrates the flame propagation combustion of the first auxiliary fuel AI1, the diffusive combustion of the second auxiliary fuel AI2, and the auto-ignition combustion of the main fuel MI inside the combustion chamber 2. FIG. 11A shows the state right before the first auxiliary fuel AI1 is injected. At this time, the injection of the main fuel MI has already ended, and while not shown in the drawings, the air-fuel mixture of the injected fuel spreads in the combustion chamber 2. Note that, in FIG. 11A, S shows the swirl flow caused inside the combustion chamber 2. On the other hand, FIG. 11B shows when the first auxiliary fuel AI1 is injected from the fuel injector 3. At this time, fuel is radially injected from the fuel injector 3 toward the inside of the combustion chamber 2. As shown in FIG. 11B, the spark plug 59 is arranged inside the flight region of this atomized fuel F.

Figure 11A:
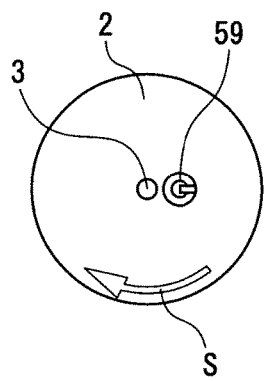
FIGS. 11 A to 11F are views for explaining auto-ignition combustion according to the present invention.
Figure 11B:
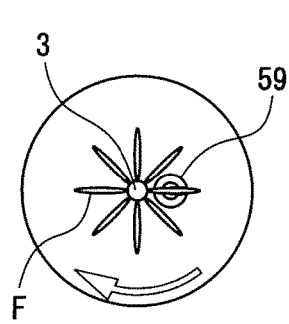
Figure 11C:
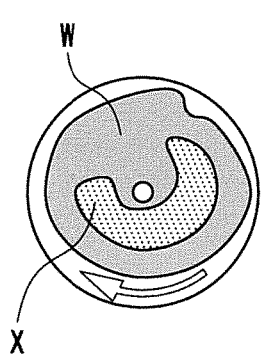

If the first auxiliary fuel AI1 is injected, as shown in FIG. 10, the ignition action by the spark plug 59 is performed. Due to this, part of the first auxiliary fuel AI1, as shown in FIG. 11C, is made to burn by flame propagation combustion. Note that, in FIG. 11C, W shows the air-fuel mixture formed by the first auxiliary fuel AI1, while X shows the flame propagation combustion region where flame propagation combustion is performed. As will be understood from FIG. 11C, if the first auxiliary fuel AI1 is injected, part of the air-fuel mixture formed by the first auxiliary fuel AI1 can be made to burn by flame propagation combustion.

Figure 11D:
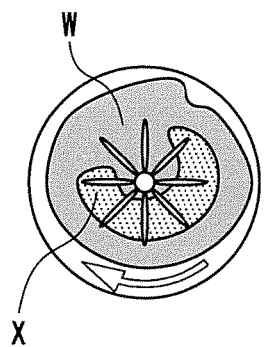
Figure 11E:
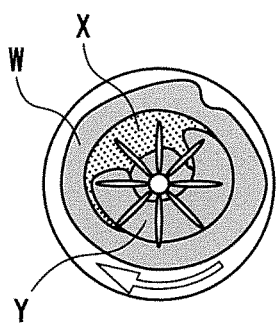
Figure 11F:
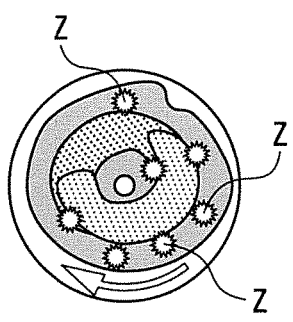

Next, as shown in FIG. 11D, the second auxiliary fuel AI2 is injected from the fuel injector 3 in the flame propagation combustion region X. If fuel is injected in the flame propagation combustion region X, the injected fuel is mixed with air while diffusing and is ignited by the flame and burned. The combustion when injected fuel is ignited by flame and made to burn in the flame propagation combustion region X will be called "diffusive combustion". In FIG. 11E, Y shows the region where this diffusive combustion is performed. If burning the second auxiliary fuel AI2 by diffusive combustion, after that, as shown in FIG. 11F by Z, the air-fuel mixture auto-ignites at a plurality of locations simultaneously and the main fuel MI burns by auto-ignition combustion.

Now then, as explained above, when the fuel injection amount Q exceeds the injection amount $Q_0$, if making the entire fuel auto-ignite, the combustion noise becomes greater. In this case, if possible to make only the injection amount $Q_0$ burn by auto-ignition combustion and make the remaining fuel $(Q-Q_0)$ stably and gently burn, then it would be possible to keep the combustion noise low. In this regard, in flame propagation combustion, variations in ignition cause variations in generation of the flame, and variations in fuel atomization cause variations in how the flame is propagated. As a result, the ratio of combustion of the air-fuel mixture changes and stable combustion cannot be obtained. As opposed to this, diffusive combustion is performed by injecting fuel inside a flame. If injecting fuel inside a flame in this way, the injection fuel is reliably ignited by the flame, so the diffusive combustion becomes considerably stabler compared with flame propagation combustion. Further, this diffusive combustion is performed by the successive combustion of the injected fuel, so the combustion becomes gentler. Therefore, if making only the injection amount $Q_0$ burn by auto-ignition combustion and making the most part of the remaining fuel $(Q-Q_0)$ burn by diffusive combustion, it would be possible to keep the combustion noise low.

Therefore, in the present invention, part of the fuel is made to burn by diffusive combustion. FIG. 10 shows the heat release rate when using the action of ignition by the spark plug 59 to make the first auxiliary fuel AI1 burn by flame propagation combustion and when injecting the second auxiliary fuel AI2 into the flame propagation combustion region to make the second auxiliary fuel AI2 burn by diffusive combustion before auto-ignition of the main fuel MI occurs. Note that, FIG. 10 shows the case of dividing the same amount of fuel as the amount of fuel injection in the case shown in FIG. 9A into the three parts of the main fuel MI, the first auxiliary fuel AI1, and the second auxiliary fuel AI2. If comparing FIG. 9A and FIG. 10, when injecting the first auxiliary fuel AI1 and the second auxiliary fuel AI2 in addition to the main fuel MI as shown in FIG. 10, compared with when performing the fuel injection only once as shown in FIG. 9A, the peak of the heat release rate becomes smaller and the change of the heat release rate becomes gentler. As a result, rapid rise of the combustion pressure is suppressed, so the generation of combustion noise is suppressed.

Note that, in FIG. 10, the auto-ignition combustion of the main fuel MI is started triggered by the diffusive combustion by the second auxiliary fuel AI2. In this case, the diffusive combustion which acts as a trigger stabilizes as explained above. Therefore, by performing diffusive combustion, it is possible to stably cause auto-ignition combustion of the main fuel MI. Further, if diffusive combustion is performed, soot is produced. However, after the diffusive combustion, auto-ignition combustion of the main fuel MI is caused. This auto-ignition combustion is performed in the presence of sufficient oxygen, so the soot produced when diffusive combustion is performed is reoxidized while the auto-ignition combustion is being performed. Therefore, it is possible to suppress the production of soot even if performing diffusive combustion.

Therefore, in the present invention, there is provided a control system of an internal combustion engine comprising the fuel injector 3 arranged in the combustion chamber 2 and injecting fuel comprised of gasoline, the spark plug 59 arranged in the combustion chamber 2 and igniting fuel injected from the fuel injector 3, and the electronic control unit 30 controlling an action of injection of fuel from the fuel injector 3 and an action of ignition by the spark plug 59. The main fuel MI injected from the fuel injector 3 into the combustion chamber 2 is caused to be auto-ignited, and the first auxiliary fuel AI1 and the second auxiliary fuel AI2 are successively injected from the fuel injector 3 during the compression stroke after injection of the main fuel MI and before auto-ignition of the main fuel MI occurs. The electronic control unit 30 is configured to control the injection timing of the first auxiliary fuel AI1, the ignition timing of the spark plug 59, and the injection timing of the second auxiliary fuel AI2 so that the first auxiliary fuel AI1 is made to burn by flame propagation combustion by the action of ignition by the spark plug 59, the second auxiliary fuel AI2 is made to be injected in the flame propagation combustion region, and the second auxiliary fuel AI2 is made to burn by diffusive combustion before the auto-ignition of the main fuel MI occurs.

Figure 12:
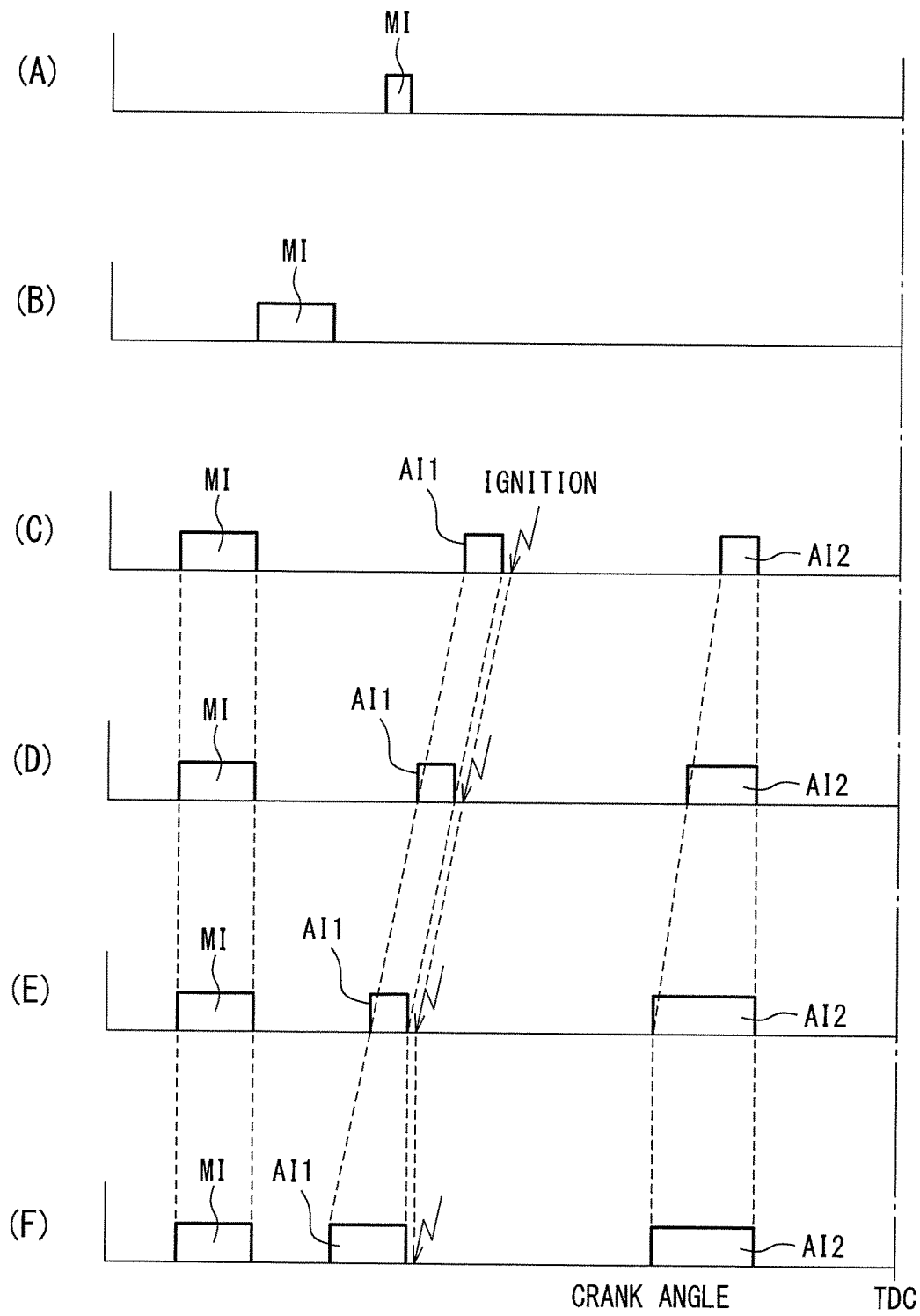
FIG. 12 is a view for explaining the injection timing when auto-ignition combustion according to the present invention is performed.

Next, referring to FIG. 12, the optimum injection timing and injection amount of the main fuel MI, the optimum injection timing and injection amount of the first auxiliary fuel AI1, the optimum injection timing and injection amount of the second auxiliary fuel AI2, and the optimum ignition timing of the spark plug 59 which are determined in accordance with the engine load, that is, determined in accordance with the torque generated by the engine, will be explained. In FIG. 12, the abscissa indicates the crank angle, and as the engine load becomes higher, that is, as the torque generated by the engine becomes higher, the injection timing and the injection amount changes from the injection timing and the injection amount shown by (A) toward the injection timing and the injection amount shown by (F). Note that, FIG. 12 shows the changes of the injection timing and injection amount when the engine speed is a certain constant speed.

(A) and (B) of FIG. 12 show when the torque Tr generated by the engine becomes lower than the boundary X in FIG. 8, that is, when the fuel injection amount Q becomes smaller than the injection amount $Q_0$ in FIG. 9B. In this case, only the main fuel MI is injected. As the engine load becomes higher, that is, the torque generated by the engine becomes higher, the injection time period, that is, the injection amount of the main fuel MI increases and the injection timing of the main fuel MI is advanced. Note that, in the case shown in (A) and (B) of FIG. 12, the first auxiliary fuel AI1 may be injected and ignited by the spark plug 59 whereby the produced flame propagation combustion is used as the flame to start the auto-ignition combustion of the main fuel MI.

On the other hand, (C) to (F) of FIG. 12 show when the torque Tr generated by the engine is higher than the boundary X in FIG. 8, that is, when the fuel injection amount Q is greater than the injection amount $Q_0$ in FIG. 9B. At this time, after the injection of the main fuel MI, the first auxiliary fuel AI1 and the second auxiliary fuel AI2 are injected. In this case, as shown in (C) to (F) of FIG. 12, the injection time period, that is, the injection amount of the main fuel MI is held constant even if the engine load becomes higher, that is, the torque generated by the engine becomes higher. The injection timing of the main fuel MI is also held at a constant value.

On the other hand, as shown in (C) to (E) of FIG. 12, the injection time period, that is, the injection amount of the second auxiliary fuel AI2 is gradually increased as the engine load becomes higher, that is, as the torque generated by the engine becomes higher. In this case, as shown in (C) to (E) of FIG. 12, the injection end timing of the second auxiliary fuel AI2 is maintained at a constant value a constant crank angle before compression top dead center TDC even if the engine load becomes higher, that is, even if the torque generated by the engine becomes higher, while the injection start timing, that is, the injection timing of the second auxiliary fuel AI2 is advanced the more the engine load rises, that is, the more the torque generated by the engine rises. Note that, the start timing of the auto-ignition combustion of the main fuel MI is greatly affected by the injection end timing of the second auxiliary fuel AI2. Therefore, the injection end timing of the second auxiliary fuel AI2 is held at a constant value so that the start timing of auto-ignition combustion of the main fuel MI becomes constant.

On the other hand, as shown in (C) to (E) of FIG. 12, the injection amount of the first auxiliary fuel AI1 is held at a constant value even if the engine load becomes higher, that is, even if the torque generated by the engine becomes higher. Therefore, when the fuel injection amount Q increases, the injection amount of the second auxiliary fuel AI2 is increased, that is, the amount of fuel burned by diffusive combustion is increased. This diffusive combustion, as explained above, is stable. Therefore, when the engine load becomes higher, that is, when the torque generated by the engine becomes higher, by increasing the amount of fuel burned by diffusive combustion in this way, it is possible to secure stable combustion even when the engine load becomes higher, that is, the torque generated by the engine becomes higher.

On the other hand, the ignition action of the spark plug 59 is performed during injection of the first auxiliary fuel AI1 or right after the end of injection of the first auxiliary fuel AI1. The flame propagation combustion region of the first auxiliary fuel AI1 due to the ignition action of the spark plug 59 gradually expands along with the elapse of time. On the other hand, to secure stable good diffusive combustion, the injection action of the second auxiliary fuel AI2 has to be started when the flame propagation combustion region becomes a certain predetermined size or more. In this case, a certain time is required for the flame propagation combustion region to become a certain predetermined size or more. Therefore, in this embodiment according to the present invention, the first auxiliary fuel AI1 is injected a constant time period before the injection start timing of the second auxiliary fuel AI2.

In this regard, as explained above, FIG. 12 shows the injection timing and the injection amount when the engine speed is a certain constant speed. Therefore, in the example shown in FIG. 12, the injection action of the first auxiliary fuel AI1 is performed a constant crank angle before the injection start timing of the second auxiliary fuel AI2. That is, in the embodiment according to the present invention, as shown in (C) to (E) of FIG. 12, the injection timing of the first auxiliary fuel AI1 is advanced as the engine load becomes higher, that is, as the torque generated by the engine becomes higher, and the ignition timing of the spark plug 59 is also advanced as the engine load becomes higher, that is, as the torque generated by the engine becomes higher.

On the other hand, if the injection amount of the second auxiliary fuel AI2 increases, the amount of production of soot at the time of diffusive combustion increases. If the amount of production of soot exceeds a certain limit, a large amount of soot will be discharged from the combustion chamber 2 without being reoxidized. Therefore, there is a limit amount of the injection amount of the second auxiliary fuel AI2 determined from the amount of production of soot. FIG. 12E shows when the injection amount of the second auxiliary fuel AI2 reaches this limit amount. It is not preferable to make the injection amount of the second auxiliary fuel AI2 increase over this limit amount. Therefore, in the embodiment according to the present invention, when the engine load further increases, that is, when the torque generated by the engine further increases, as shown in FIG. 12F, the injection amount of the second auxiliary fuel AI2 is maintained at this limit amount without increasing it and the injection amount of the first auxiliary fuel AI1 is made to increase.

Note that, as shown in (F) of FIG. 12, when the injection amount of the first auxiliary fuel AI1 is increased without increasing the injection amount of the second auxiliary fuel AI2, as compared with the case of FIG. 12E, the injection end timing of the first auxiliary fuel AI1 and the ignition timing of the spark plug 59 are not changed and the injection start timing of the first auxiliary fuel AI1 is advanced. If the injection start timing, that is, the injection timing of the first auxiliary fuel AI1 is advanced in this way, the first auxiliary fuel AI1 injected in the first half spreads to the periphery of the combustion chamber 2 and the first auxiliary fuel AI1 injected in the second half causes formation of the flame propagation combustion region. Therefore, at this time, the size of the flame propagation combustion region when injection of the second auxiliary fuel is started becomes substantially the same as the case (E) of FIG. 12. Therefore, good diffusive combustion with suppressed production of soot is performed. On the other hand, the first auxiliary fuel AI1 injected at the first half is made to burn when the main fuel MI burns by auto-ignition combustion. Note that, the injection amount of the second auxiliary fuel AI2 is stored as a function of the torque Tr generated by the engine and engine speed N in the form of a map such as shown in FIG. 13 in advance in the ROM 32.

If summarizing the above explanation, in the embodiment according to the present invention, in the engine operating region, the auto-ignition combustion region RR for causing auto-ignition combustion is preset. When the torque Tr generated by the engine exceeds the predetermined boundary X inside the auto-ignition combustion region RR, the fuel injection of the main fuel MI, the fuel injection of the first auxiliary fuel AI1, and the fuel injection of the second auxiliary fuel AI2 are successively performed. When the torque Tr generated by the engine is lower than the predetermined boundary X inside the auto-ignition combustion region RR, only the fuel injection of the main fuel MI or only the fuel injection of the main fuel MI and the fuel injection of the first auxiliary fuel AI1 are performed.

Further, as shown in (C) to (E) of FIG. 12, in the embodiment according to the present invention, when the fuel injection of the main fuel MI, the fuel injection of the first auxiliary fuel AI1, and the fuel injection of the second auxiliary fuel AI2 are successively performed, as the torque Tr generated by the engine becomes higher, the injection amount of the second auxiliary fuel AI2 is increased, and the injection timing of the second auxiliary fuel AI2, the injection timing of the first auxiliary fuel AI1 and the ignition timing are advanced. Furthermore, when the torque Tr generated by the engine further increases after the injection amount of the second auxiliary fuel AI2 is increased and reaches the predetermined limit amount, as shown in (F) of FIG. 12, the injection amount of the first auxiliary fuel AI1 is increased and the injection timing of the first auxiliary fuel AI1 is advanced.

Figure 14A:
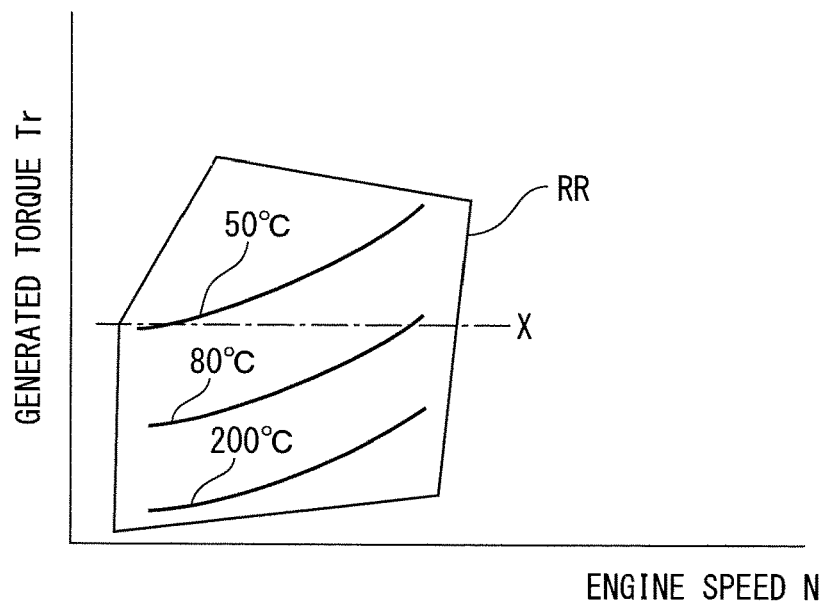
FIGS. 14A, 14B, and 14C are views showing examples of the intake temperature in a combustion chamber at the start of compression, etc.

Now then, as explained above, generally speaking, if the temperature of the air-fuel mixture in the combustion chamber 2 does not exceed 900K, auto-ignition combustion does not occur. Therefore, in the auto-ignition region RR of FIG. 8, at the time of engine low load operation of low pressure and low temperature of the air-fuel mixture at the start of compression, the intake temperature in the combustion chamber 2 at the start of compression has to be raised so that the temperature of the air-fuel mixture in the combustion chamber 2 exceeds 900K. FIG. 14A shows one example of the intake temperature in the combustion chamber 2 at the start of compression required for causing auto-ignition combustion in the auto-ignition region RR. As shown in FIG. 14A, the intake temperature in the combustion chamber 2 at the start of compression is made higher the lower the torque Tr generated by the engine and is made higher as the engine speed N becomes higher.

Figure 14B:
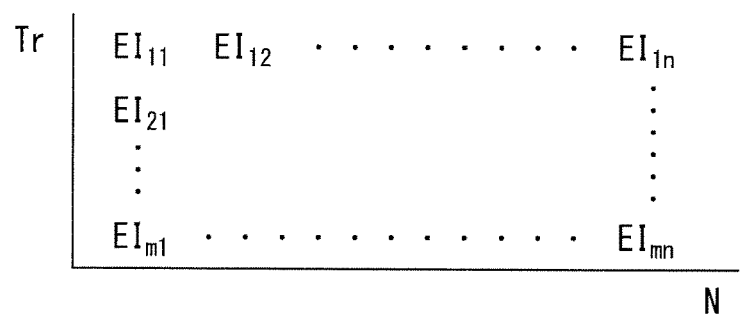
Figure 14C:
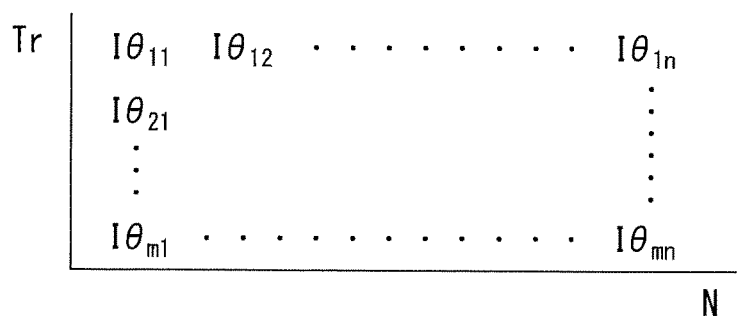

In this case, as explained above, the intake temperature in the combustion chamber 2 at the start of compression can be controlled by changing the amount of recirculation of cooling water to the intercooler 12 by the cooling water pump 14. Further, the intake temperature in the combustion chamber 2 at the start of compression can be controlled by causing the exhaust valve 56 to open twice as shown in FIG. 7A and by making the opening timing of the exhaust valve 56 change by control of the feed and discharge of hydraulic fluid by the hydraulic fluid feed/discharge control valve 90 of the variable valve timing mechanism 81. In the embodiment according to the present invention, the drive electric power EI of the cooling water pump 14 necessary for obtaining the optimum intake temperature in the combustion chamber 2 at the start of compression is stored as a function of the torque Tr generated by the engine and engine speed N in the form of a map such as shown in FIG. 14B in advance in the ROM 32, while the drive electric power 10 of the hydraulic fluid feed/discharge control valve 90 required for obtaining the optimum intake temperature in the combustion chamber 2 at the start of compression is stored as a function of the torque Tr generated by the engine and engine speed N in the form of a map such as shown in FIG. 14C in advance in the ROM 32.

Figure 15A:
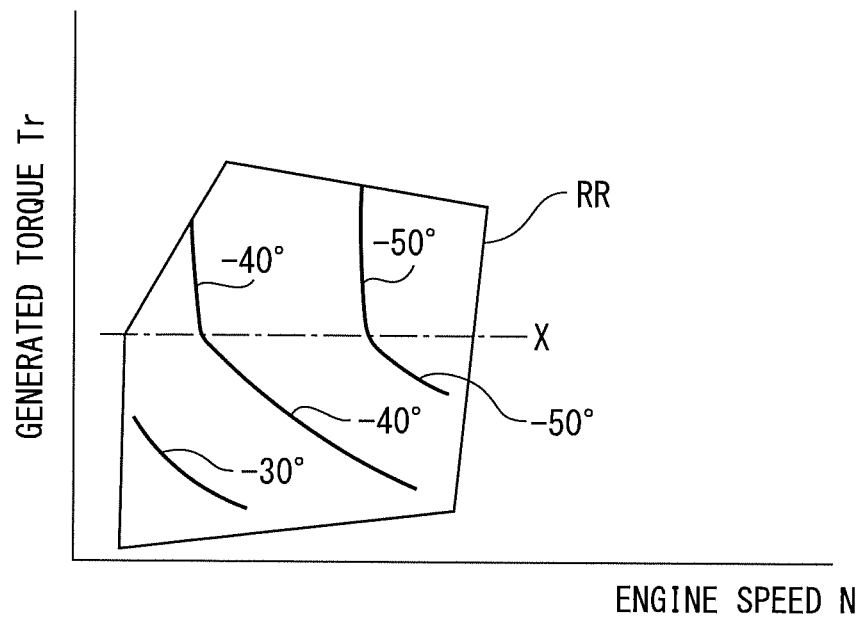
FIGS. 15A and 15B are respectively views showing a typical example of the injection timing of main fuel MI and a map of the injection timing W of the main fuel MI.
Figure 15B:
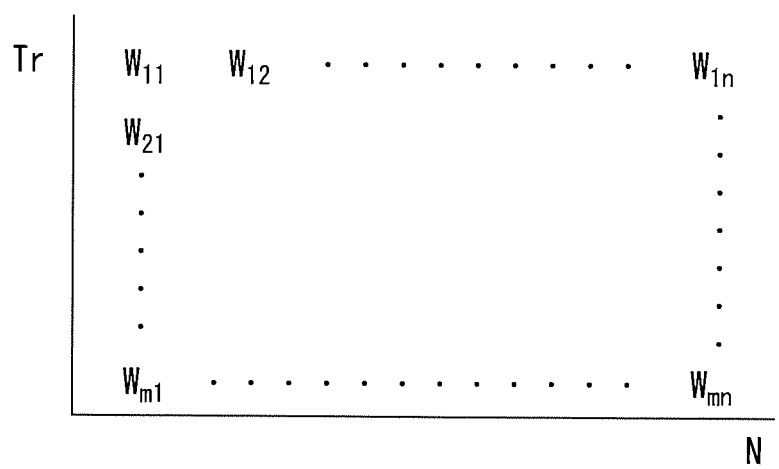

On the other hand, FIG. 15A shows a typical example of the injection timing of the main fuel MI. Note that, in FIG. 15A, the solid line shown in the auto-ignition region RR shows the equivalent injection timing (shown by the crank angle after compression top dead center ATDC). That is, the more the injection amount of the main fuel MI increases, the longer the injection time period of the main fuel MI becomes, so the more the injection amount of the main fuel MI increases, the more the injection timing of the main fuel MI is advanced. On the other hand, the auto-ignition reaction requires time, so the more the engine speed N rises, the more the injection timing of the main fuel MI is advanced. Therefore, as shown in FIG. 15A, in the auto-ignition region RR with a generated torque Tr lower than the boundary X, the more the injection amount of the main fuel MI increases, that is, the more the torque Tr generated by the engine rises, the more the injection timing of the main fuel MI is advanced, while the more the engine speed N rises, the more the injection timing of the main fuel MI is advanced. In the embodiment according to the present invention, the injection timing W of the main fuel MI in the auto-ignition region RR is stored as a function of the torque Tr generated by the engine and engine speed N in the form of a map such as shown in FIG. 15B in advance in the ROM 32.

On the other hand, in the embodiment according to the present invention, when the demanded injection amount increases in the auto-ignition region RR with a generated torque Tr higher than the boundary X, the injection amount of the main fuel MI is held constant. In that state, the injection amount of the second auxiliary fuel AI2 is increased. In this way, even if the demanded injection amount increases in the auto-ignition region RR with a generated torque Tr higher than the boundary X, the injection amount of the main fuel MI is held constant, so the injection timing of the main fuel MI, as shown in FIG. 15A, will not be advanced even if the torque Tr generated by the engine becomes higher. The injection timing of the main fuel MI is advanced as the engine speed N becomes higher. Note that, the main fuel MI may be performed during the suction stroke.

Further, in the embodiment according to the present invention, the optimum injection timing W1 of the first auxiliary fuel AI1 is stored as a function of the torque Tr generated by the engine and engine speed N in the form of a map such as shown in FIG. 16A in advance in the ROM 32, while the optimum injection timing W2 of the second auxiliary fuel AI2 is stored as a function of the torque Tr generated by the engine and engine speed N in the form of a map such as shown in FIG. 16B in advance in the ROM 32. Furthermore, the optimum ignition timing by the spark plug 59 is stored as a function of the torque Tr generated by the engine and engine speed N in the form of a map such as shown in FIG. 16C in advance in the ROM 32.

In this regard, in the embodiment according to the present invention, as explained above, the drive electric power EI of the cooling water pump 14 and the drive electric power 10 of the hydraulic fluid feed/discharge control valve 90 for obtaining the intake temperature in the combustion chamber 2 at the start of compression required for causing auto-ignition combustion are stored in advance, and therefore if controlling the drive electric power EI of the cooling water pump 14 and the drive electric power 10 of the hydraulic fluid feed/discharge control valve 90 to the respective drive electric powers stored in advance, it is possible to make the intake temperature in the combustion chamber 2 at the start of compression the intake temperature necessary for causing auto-ignition combustion. However, even if controlling the drive electric power in this way, for example, sometimes rapid changes in the surrounding environment will cause the intake temperature to fall below the temperature required for causing auto-ignition combustion and the operating state will become one where it is hard for the main fuel MI to auto-ignite.

Figure 17A:
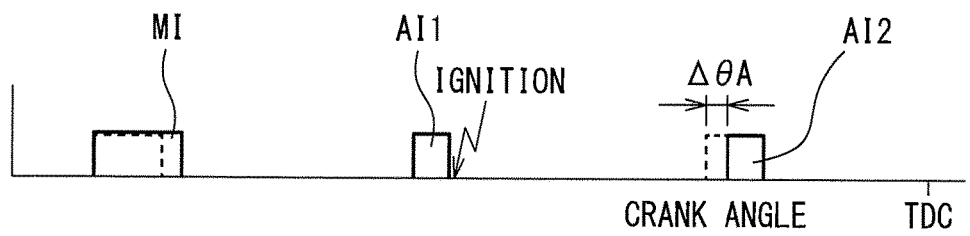
FIGS. 17A, 17B, and 17C are views for explaining fuel injection control in an operating state where auto-ignition is difficult.

In this way, when the operating state is one where it is hard for the main fuel MI to auto-ignite, if strengthening the diffusive combustion due to the second auxiliary fuel AI2, the temperature of the air-fuel mixture will rise and as a result the main fuel MI will easily auto-ignite. Therefore, in the embodiment according to the present invention, when the operating state is one where it is hard for the main fuel MI to auto-ignite, as shown in FIG. 17A, the injection start timing of the second auxiliary fuel AI2 is made to advance by exactly $\Delta\theta A$. Due to this, the injection amount of the second auxiliary fuel AI2 is made to increase and a powerful diffusive combustion is caused. Note that, at this time, the injection amount of the main fuel MI is made to be reduced as shown by the broken line in FIG. 17A so that the total amount of the fuel injection amount Q does not change.

In this regard, in the embodiment according to the present invention, whether the operating state is one where it is hard for the main fuel MI to auto-ignite is made to be judged from the ignition delay time when the main fuel MI is burned by auto-ignition combustion. In this case, in the embodiment according to the present invention, the Livengood-Wu integrals shown below are used to predict the ignition delay time when the main fuel MI is burned by auto-ignition combustion.

$$\left(\frac{1}{\tau}\right)_{P,T} = AP^n \exp\left(-\frac{E}{RT}\right) \quad (1)$$

$$\int_{t=0}^{t=te} \left(\frac{1}{\tau}\right)_{P,T} dt = 1 \quad (2)$$

$$\left(\frac{1}{\tau}\right)_{P,T} = A_1 \phi^\alpha P^\beta ON^\gamma \exp(\delta \cdot RES)\exp\left(-\frac{E}{RT}\right) \quad (3)$$

$$\sum \left(\frac{1}{\tau}\right) = \int \left(\frac{1}{\tau}\right)_{P,T} dt \quad (4)$$

The above (1) and (2) are called Livengood-Wu integrals. The Livengood-Wu integrals match the experimental values well. Note that in the above (1), $\tau$ shows the ignition delay time until auto-ignition, A shows the frequency factor, P shows the pressure (n is positive), E shows the activated energy, R shows the general gas constant, and T shows the temperature. The left side in the above formula (1) shows the reciprocal ($1/\tau$) of the ignition delay time at the pressure P and temperature T.

That is, if the temperature T becomes higher, the reaction speed (right side Arrhenius equation) becomes faster, so the ignition delay time $\tau$ becomes shorter, while if the pressure P becomes higher, the fuel density becomes higher, so the ignition delay time $\tau$ becomes shorter. Therefore, the relationship between $\tau$, T and P becomes one shown by equation (1). On the other hand, if the state where the ignition delay time is $\tau$ continues for the time period dt, in this time period dt, exactly a $dt/\tau$ percent of the time period T until auto-ignition elapses. Therefore, when the state where the ignition delay time is $\tau 1$ continues for the time period dt, the state where the ignition delay time is $\tau 2$ continues for the time period dt, and after that similarly, the state where the ignition delay time is $\tau n$ continues for the time period dt, auto-ignition occurs when the sum of $dt/\tau_1$, $dt/\tau_2$ ... $dt/\tau_n$ ... becomes 100%, that is, 1. Therefore, as shown in equation (2), when integrating by time the reciprocal ($1/\tau$) of the ignition delay time at the pressure P and temperature T, the time period $t_e$ where the integral becomes 1 becomes the ignition delay time $\tau$.

The above equation (3) shows an equation often used as an equation showing the reciprocal ($1/\tau$) of the ignition delay time in the case of considering other factors actually having an effect besides the pressure P and temperature T. Note that, in the equation (3), $\phi$ indicates the equivalent ratio, ON the octane value, RES the residual gas ratio (%), and A', $\alpha$, $\beta$, $\gamma$, and $\delta$ constants (A', $\alpha$, $\beta$, $\delta$>0, $\gamma$<0). The other symbols are similar to equation (1). Note that, below, the time integral of equation (3) is shown by $\Sigma(1/\tau)$ such as shown in equation (4). From the above equation (3), it is learned that the more the pressure P rises, the shorter the ignition delay time $\tau$ becomes, the more the temperature T rises, the shorter the ignition delay time $\tau$ becomes, the larger the equivalent ratio $\phi$ becomes, the shorter the ignition delay time $\tau$ becomes, the more the residual gas ratio RES rises, the shorter the ignition delay time $\tau$ becomes, and the lower the octane value ON, the shorter the ignition delay time $\tau$ becomes.

Figure 17B:
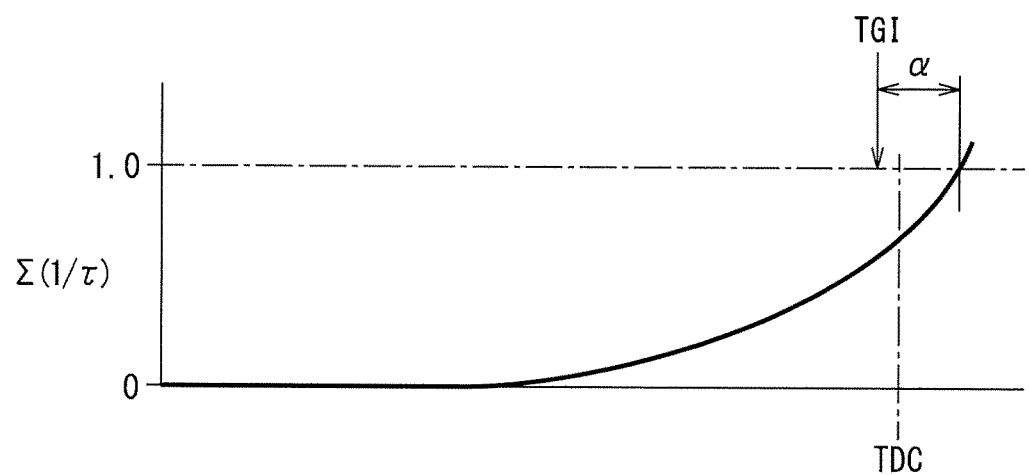
Figure 17C:
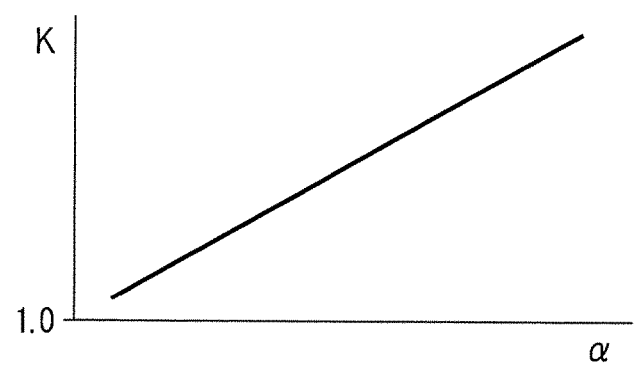

FIG. 17B shows one example of the change of the calculated $\Sigma(1/\tau)$. Note that, in FIG. 17B, the abscissa shows the crank angle, while TGI shows the optimum auto-ignition timing, that is, the target auto-ignition timing. Further, as explained above, when $\Sigma(1/\tau)$ becomes 1, auto-ignition combustion occurs. FIG. 17B shows the case where the auto-ignition timing is delayed from the target auto-ignition timing TGI by exactly $\alpha$. In the embodiment according to the present invention, when the auto-ignition timing is retarded from the target auto-ignition timing TGI, the injection amount of the second auxiliary fuel AI2 increases so that the auto-ignition timing becomes the target auto-ignition timing TGI. In this case, in the embodiment of the present invention, the correction coefficient K for the injection amount of the second auxiliary fuel AI2 is used to control the injection amount of the second auxiliary fuel AI2. In the embodiment of the present invention, as shown in FIG. 17C, the more this delay amount $\alpha$ increases, the more the value of the correction coefficient K with respect to the injection amount of the second auxiliary fuel AI2 is increased. The relationship shown in FIG. 17C is stored in advance.

The calculation of the ignition delay time using the Livengood-Wu integrals is performed by the electronic control unit 30. Therefore, in the embodiment according to the present invention, the electronic control unit 30 is used to judge if the operating state is one where it is hard for the main fuel MI to auto-ignite. When it is judged that the operating state is one where it is hard for the main fuel MI to auto-ignite, the injection amount of the second auxiliary fuel AI2 is increased. Note that in the embodiment according to the present invention, specifically speaking, the electronic control unit 30 is configured to predict the auto-ignition timing of the main fuel MI, and when the predicted auto-ignition timing of the main fuel MI is delayed by a predetermined crank angle or more from the target auto-ignition timing TGI, it is judged that the operating state is one where it is hard for the main fuel MI to auto-ignite.

Figure 18:
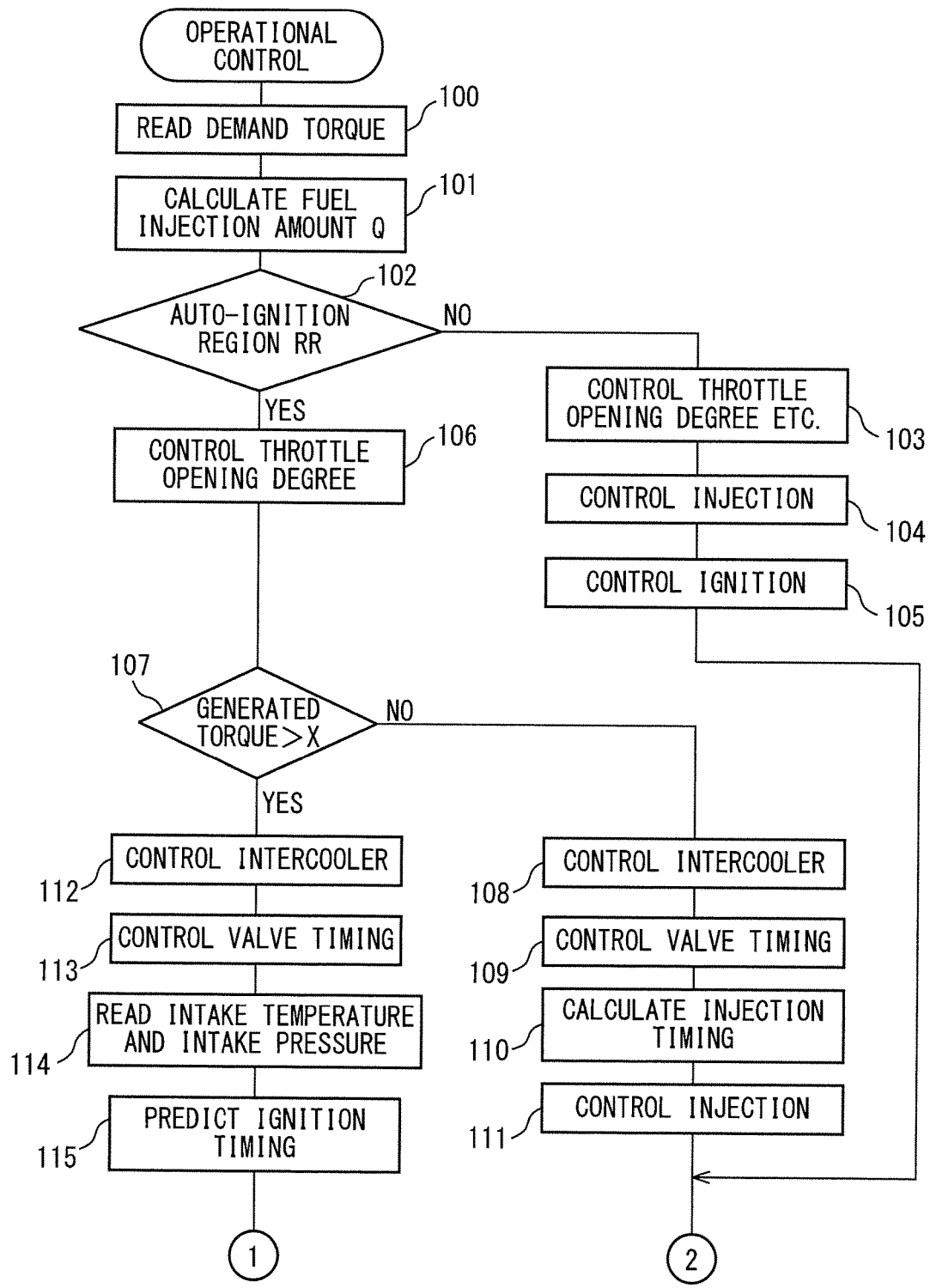
FIG. 18 is a flow chart for engine operational control.

FIG. 18 and FIG. 19 show an operational control routine of an engine. This routine is performed by interruption every fixed time period.

Referring to FIG. 18, first, at step 100, the demand torque of the engine calculated based on the output signal of the load sensor 41 is read in. Next, at step 101, the fuel injection amount Q from the fuel injector 3 is calculated based on this demand torque. The fuel injection amount Q increases along with the rise of the demand torque. Next, at step 102, it is judged if the engine operating state is within the auto-ignition region RR shown in FIGS. 8, 14A and 15A. When it is judged that the engine operating state is not in the auto-ignition region RR shown in FIGS. 8, 14A and 15A, the routine proceeds to step 103 where a spark ignition combustion in which the air-fuel mixture is ignited by using the spark plug 59 is performed.

That is, at step 103, the opening degree of the throttle valve 11, the amount of recirculation of cooling water to the intercooler 12 by the cooling water pump 14, and the opening timing of the exhaust valve 56 by the variable valve timing mechanism 81 are controlled to values suitable for spark ignition combustion by the spark plug 59. Next, at step 104, the fuel injection amount Q calculated at step 101 is used to control an injection of fuel from the fuel injector 3. Next, at step 105, ignition control of the air-fuel mixture by the spark plug 59 is performed.

On the other hand, when, at step 102, it is judged that the engine operating state is in the auto-ignition region RR shown in FIGS. 8, 14A and 15A, the routine proceeds to step 106 where auto-ignition combustion is performed. That is, at step 106, the opening degree of the throttle valve 11 is controlled so that the air-fuel ratio becomes a predetermined lean air-fuel ratio corresponding to the engine operating state. Next, at step 107, it is judged if the torque Tr generated by the engine is higher than the boundary X shown in FIGS. 8, 14A and 15A. When it is judged that the torque Tr generated by the engine is lower than the boundary X shown in FIGS. 8, 14A and 15A, the routine proceeds to step 108 where only the main fuel MI is injected.

That is, at step 108, the cooling water pump 14 is driven by the drive electric power EI calculated from the map shown in FIG. 14B and at step 109, the hydraulic fluid feed/discharge control valve 90 is driven by the drive electric power I$\theta$ calculated from the map shown in FIG. 14C so that the intake temperature in the combustion chamber 2 at the start of compression becomes the intake temperature shown in FIG. 14A. Next, at step 110, the injection timing W of the main fuel MI is calculated from the map shown in FIG. 15B. Next, at step 111, the fuel injection amount Q calculated at step 101 and the injection timing W calculated at step 110 are used to control an injection of the main fuel MI from the fuel injector 3.

On the other hand, when, at step 107, it is judged that the torque Tr generated by the engine is higher than the boundary X shown in FIGS. 8, 14A and 15A, the routine proceeds to step 112 where the main fuel MI, the first auxiliary fuel AI1, and the second auxiliary fuel AI2 are injected. That is, at step 112, the cooling water pump 14 is driven by the drive electric power EI calculated from the map shown in FIG. 14B and at step 113, the hydraulic fluid feed/discharge control valve 90 is driven by the drive electric power 10 calculated from the map shown in FIG. 14C so that the intake temperature in the combustion chamber 2 at the start of compression becomes the intake temperature shown in FIG. 14A.

Next, at step 114, the intake temperature detected by the temperature sensor 25 and the intake pressure detected by the pressure sensor 26 are read in. Next, at step 115, based on the detected intake temperature and intake pressure, the ignition delay time when the main fuel MI is burned by auto-ignition is predicted by using the Livengood-Wu integrals, and the delay amount $\alpha$ of the auto-ignition timing from the target auto-ignition timing TGI is calculated. Next, at step 116 shown in FIG. 19, it is judged whether the operating state is one where it is hard for the main fuel MI to auto-ignite. In this case, whether the operating state is one where it is hard for the main fuel MI to auto-ignite is judged from the ignition delay time when auto-ignition combustion of the main fuel MI is performed. Specifically speaking, in the embodiment of the present invention, as explained above, when the predicted auto-ignition timing of the main fuel MI is delayed from target auto-ignition timing TGI by a predetermined crank angle or more, that is, when the delay amount α exceeds a predetermined fixed amount, it is judged that the operating state is one where auto-ignition is hard.

When, at step 116, it is judged that the operating state is not one where it is hard for the main fuel MI to auto-ignite, the routine proceeds to step 117 where the injection amount of the main fuel MI is calculated. In the example shown in FIG. 19, at this time, the injection amount of the main fuel MI is made the injection amount $Q_0$ shown in FIG. 9B. Next, at step 118, the injection timing W of the main fuel MI is calculated from the map shown in FIG. 15B. Next, at step 119, the injection amount QA2 of the second auxiliary fuel AI2 is calculated from the map shown in FIG. 13. Next, at step 120, the injection timing W2 of the second auxiliary fuel AI2 is calculated from the map shown in FIG. 16B.

Next, at step 121, the injection amount QA1 of the first auxiliary fuel AI1 (=Q−QA2) is calculated by subtracting the injection amount QA2 of the second auxiliary fuel AI2 from the fuel injection amount Q calculated at step 101. Next, at step 122, the injection timing W1 of the first auxiliary fuel AI1 is calculated from the map shown in FIG. 16A. Next, at step 123, injection control of the main fuel MI, the first auxiliary fuel AI1, and the second auxiliary fuel AI2 is performed. Next, at step 124, the ignition timing of the spark plug 59 is calculated from the map shown in FIG. 16C. Next, at step 125, ignition control by the spark plug 59 is performed.

On the other hand, when, at step 116, it is judged that the operating state is one where it is hard for the main fuel MI to auto-ignite, the routine proceeds to step 126 where the value of the correction coefficient K is calculated from the relationship shown in FIG. 17C based on the delay amount α calculated at step 115. Next, at step 127, the injection amount QA2 of the second auxiliary fuel AI2 is calculated from the map shown in FIG. 13. Next, at step 128, the correction coefficient K is multiplied with the injection amount QA2 of the second auxiliary fuel AI2 calculated at step 127 to thereby calculate the final injection amount QA2 of the second auxiliary fuel AI2. Next, at step 129, the advancing amount ΔθA shown in FIG. 17A is calculated based on the final injection amount QA2 of the second auxiliary fuel AI2.

Next, at step 130, the injection timing W2 of the second auxiliary fuel AI2 is calculated from the map shown in FIG. 16B. Next, at step 131, the advancing amount ΔθA calculated at step 129 is added to the injection timing W2 of the second auxiliary fuel AI2 calculated at step 130 to thereby calculate the final injection timing W2 of the second auxiliary fuel AI2. Next, at step 132, the amount of increase of the injection amount QA2 of the second auxiliary fuel AI2 ((K−1)· the injection amount QA2 of the second auxiliary fuel AI2 calculated from the map shown in FIG. 13) is subtracted from the injection amount $Q_0$ to thereby calculate the injection amount MI of the main fuel MI. Next, at step 133, the injection timing W of the main fuel MI is calculated from the map shown in FIG. 15B. Next, the routine proceeds to step 121.

The invention claimed is:

1. A control system of an internal combustion engine comprising:
   a fuel injector arranged in a combustion chamber and injecting a fuel comprised of gasoline,
   a spark plug arranged in the combustion chamber and igniting the fuel injected from the fuel injector, and
   an electronic control unit configured to:
      control an action of injection of the fuel from the fuel injector and an action of ignition by the spark plug, wherein a main injection of the fuel injected from the fuel injector into the combustion chamber is caused to be auto-ignited,
      control the fuel injector such that a first auxiliary injection and a second auxiliary injection successively occur during a compression stroke after said main injection and before auto-ignition of the fuel injected during said main injection occurs, and
      control an injection timing of said first auxiliary injection, an ignition timing of the spark plug, and an injection timing of said second auxiliary injection so that the fuel injected during said first auxiliary injection is made to burn by flame propagation combustion by the action of ignition by the spark plug, the fuel injected during said second auxiliary injection is made to be injected in a flame propagation combustion region, and the fuel injected during said second auxiliary injection is made to burn by diffusive combustion before the auto-ignition of the main fuel occurs,
   wherein the injection timing of said first auxiliary injection and the injection timing of said second auxiliary injection are varied depending on a torque generated by the engine,
   wherein when said main injection, said first auxiliary injection, and said second auxiliary injection are successively performed, an injection amount of said second auxiliary injection is increased and the injection timing of said second auxiliary injection, the injection timing of said first auxiliary injection, and the ignition timing are advanced as the torque generated by the engine becomes higher, and
   wherein when the torque generated by the engine further increases after the injection amount of said second auxiliary injection is increased and reaches a predetermined limit amount, an injection amount of said first auxiliary injection is increased and the injection timing of said first auxiliary injection is advanced.

2. The control system of an internal combustion engine as claimed in claim 1, wherein in an engine operating region, an auto-ignition combustion region for causing auto-ignition combustion is set in advance, said main injection, said first auxiliary injection, and said second auxiliary injection are successively performed when the torque generated by the engine exceeds a preset boundary in said auto-ignition combustion region, and only said main injection or only said main injection and said first auxiliary injection are performed when the torque generated by the engine is lower than the preset boundary in said auto-ignition combustion region.

3. A control system of an internal combustion engine comprising:
   a fuel injector arranged in a combustion chamber and injecting a fuel comprised of gasoline, a spark plug arranged in the combustion chamber and igniting the fuel injected from the fuel injector, and
an electronic control unit configured to:
control an action of injection of the fuel from the fuel injector and an action of ignition by the spark plug, wherein a main injection of the fuel injected from the fuel injector into the combustion chamber is caused to be auto-ignited,
control the fuel injector such that a first auxiliary injection and a second auxiliary injection successively occur during a compression stroke after said main injection and before auto-ignition of the fuel injected during said main injection occurs, and
control an injection timing of said first auxiliary injection, an ignition timing of the spark plug, and an injection timing of said second auxiliary injection so that the fuel injected during said first auxiliary injection is made to burn by flame propagation combustion by the action of ignition by the spark plug, the fuel injected during said second auxiliary injection is made to be injected in a flame propagation combustion region, and the fuel injected during said second auxiliary injection is made to burn by diffusive combustion before the auto-ignition of the main fuel occurs,
wherein the injection timing of said first auxiliary injection and the injection timing of said second auxiliary injection are varied depending on a torque generated by the engine,
wherein said electronic control unit is configured to judge if an operating state is one where it is hard for the fuel injected during said main injection to auto-ignite, and when it is judged that the operating state is one where it is hard for the fuel injected during said main injection to auto-ignite, an injection amount of said second auxiliary injection is increased, and
wherein said electronic control unit is configured to predict an auto-ignition timing of the fuel injected during said main injection, and when a predicted auto-ignition timing of the fuel injected during said main injection is delayed from a target auto-ignition timing by a predetermined crank angle or more, it is judged that the operating state is one where it is hard for the fuel injected during said main injection to auto-ignite.

4. The control system of an internal combustion engine as claimed in claim 3, wherein in an engine operating region, an auto-ignition combustion region for causing auto-ignition combustion is set in advance, said main injection, said first auxiliary injection, and said second auxiliary injection are successively performed when the torque generated by the engine exceeds a preset boundary in said auto-ignition combustion region, and only said main injection or only said main injection and said first auxiliary injection are performed when the torque generated by the engine is lower than the preset boundary in said auto-ignition combustion region.

* * * * *